(12) United States Patent
Suzuki et al.

(10) Patent No.: US 10,391,836 B2
(45) Date of Patent: Aug. 27, 2019

(54) VEHICLE AIR-CONDITIONING DEVICE

(71) Applicant: Sanden Holdings Corporation, Isesaki-shi, Gunma (JP)

(72) Inventors: Kenichi Suzuki, Isesaki (JP); Ryo Miyakoshi, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 603 days.

(21) Appl. No.: 15/027,415

(22) PCT Filed: Oct. 6, 2014

(86) PCT No.: PCT/JP2014/076664
§ 371 (c)(1),
(2) Date: Apr. 5, 2016

(87) PCT Pub. No.: WO2015/053211
PCT Pub. Date: Apr. 16, 2015

(65) Prior Publication Data
US 2016/0236539 A1    Aug. 18, 2016

(30) Foreign Application Priority Data

Oct. 7, 2013 (JP) .................................. 2013-210059

(51) Int. Cl.
*G05D 23/00* (2006.01)
*B60H 1/00* (2006.01)
(Continued)

(52) U.S. Cl.
CPC ..... *B60H 1/00921* (2013.01); *B60H 1/00385* (2013.01); *B60H 1/00678* (2013.01);
(Continued)

(58) Field of Classification Search
CPC ............ B60H 1/00385; B60H 1/00678; B60H 1/221; B60H 1/12; B60H 1/00828;
(Continued)

(56) References Cited

U.S. PATENT DOCUMENTS 2,301,725 A * 11/1942 Wile ........................ F24F 11/30
                                                    62/176.6
2,628,480 A *  2/1953 Feinberg ............... F24F 5/0007
                                                    261/136
(Continued)

FOREIGN PATENT DOCUMENTS

JP    H05-058140 A    3/1993
JP    H05-106921 A    4/1993
(Continued)

OTHER PUBLICATIONS

Japan Patent Office, Notification of Reasons for Refusal issued in Application No. JP 2013-210059, dated Jun. 20, 2017.
(Continued)

*Primary Examiner* — Claire E Rojohn, III
(74) *Attorney, Agent, or Firm* — Baker Botts L.L.P.

(57) ABSTRACT

A vehicle air-conditioning device may achieve comfortable heating of a vehicle interior by starting a compressor, an indoor blower and heat generating means at appropriate timing. The vehicle air-conditioning device includes a compressor which compresses a refrigerant, a radiator disposed in an air flow passage to let the refrigerant radiate heat, a heat absorber which lets the refrigerant absorb heat, and an indoor blower which blows the air through the air flow passage. The vehicle interior is heated by heat radiated from the radiator. The vehicle air-conditioning device includes a heating medium-air heat exchanger of a heating medium circulating circuit disposed in the air flow passage to heat air supplied to the vehicle interior. On a basis of an outdoor air temperature, the timing to start the compressor, the indoor
(Continued)

blower and the heating medium circulating circuit is controlled.

21 Claims, 21 Drawing Sheets

(51) Int. Cl.
   *B60H 1/12* (2006.01)
   *B60H 1/22* (2006.01)
   *B60H 1/32* (2006.01)
(52) U.S. Cl.
   CPC ........... *B60H 1/00828* (2013.01); *B60H 1/12* (2013.01); *B60H 1/2221* (2013.01); *B60H 1/3213* (2013.01); *B60H 2001/00949* (2013.01); *B60H 2001/00957* (2013.01); *B60H 2001/3248* (2013.01); *B60H 2001/3282* (2013.01)
(58) Field of Classification Search
   CPC .... B60H 2001/3248; B60H 2001/3282; B60H 2001/00949; B60H 2001/00957
   USPC ........................................................ 165/287
   See application file for complete search history.

(56) References Cited

U.S. PATENT DOCUMENTS

| | | | | |
|---|---|---|---|---|
| 4,495,560 | A * | 1/1985 | Sugimoto | B60H 1/00814 700/34 |
| 4,557,115 | A * | 12/1985 | Nakamura | F25B 13/00 62/156 |
| 4,790,144 | A * | 12/1988 | Yokouchi | F25B 49/02 62/156 |
| 5,632,156 | A * | 5/1997 | Takeo | B60H 1/3205 62/160 |
| 5,669,226 | A * | 9/1997 | Kurahashi | B60H 1/3205 62/227 |
| 5,706,667 | A * | 1/1998 | Iritani | B60H 1/00828 165/244 |
| 5,709,098 | A * | 1/1998 | Itoh | B60H 1/3213 62/228.4 |
| 5,765,383 | A * | 6/1998 | Inoue | B60H 1/3205 62/209 |
| 5,884,497 | A * | 3/1999 | Kishita | B60H 1/3205 62/193 |
| 6,073,459 | A * | 6/2000 | Iritani | B60H 1/3205 62/204 |
| 6,237,351 | B1 | 5/2001 | Itoh et al. | |
| 6,293,123 | B1 * | 9/2001 | Iritani | B60H 1/3205 62/197 |
| 6,347,528 | B1 * | 2/2002 | Iritani | B60H 1/00357 62/324.6 |
| 2004/0007000 | A1 * | 1/2004 | Takeda | A61L 9/22 62/78 |
| 2005/0061011 | A1 * | 3/2005 | Yakumaru | B60H 1/00878 62/238.6 |
| 2007/0277541 | A1 * | 12/2007 | Nakai | F24F 1/0003 62/182 |
| 2010/0281901 | A1 * | 11/2010 | Kawase | B60H 1/00885 62/238.7 |
| 2012/0111042 | A1 * | 5/2012 | Hamada | F25B 47/025 62/157 |
| 2012/0227431 | A1 * | 9/2012 | Wang | B60H 1/00921 62/238.7 |
| 2012/0312040 | A1 * | 12/2012 | Choi | B60H 1/00392 62/156 |
| 2013/0081419 | A1 * | 4/2013 | Katoh | B60H 1/004 62/278 |
| 2013/0306302 | A1 * | 11/2013 | Osaka | B60H 1/00385 165/287 |
| 2013/0325259 | A1 * | 12/2013 | Kwon | B60H 1/00642 701/36 |
| 2014/0102666 | A1 * | 4/2014 | Ichishi | B60H 1/00828 165/11.1 |
| 2015/0266392 | A1 * | 9/2015 | Arai | B60L 11/1874 320/150 |

FOREIGN PATENT DOCUMENTS

| | | |
|---|---|---|
| JP | H08-142805 A | 6/1996 |
| JP | 2001-248920 A | 9/2001 |
| JP | 2002-211234 A | 7/2002 |
| JP | 2004-155264 A | 6/2004 |
| JP | 2010-013044 A | 1/2010 |
| JP | 2010-058587 A | 3/2010 |
| JP | 2013-248966 A | 12/2013 |

OTHER PUBLICATIONS

International Searching Authority (JPO), International Search Report for International Patent Application No. PCT/JP2014/076664, dated Jan. 6, 2015.
The State Intellectual Property Office of the People'S Republic of China, The First Office Action for Application No. CN 201480055399.1, dated Feb. 4, 2017.

* cited by examiner

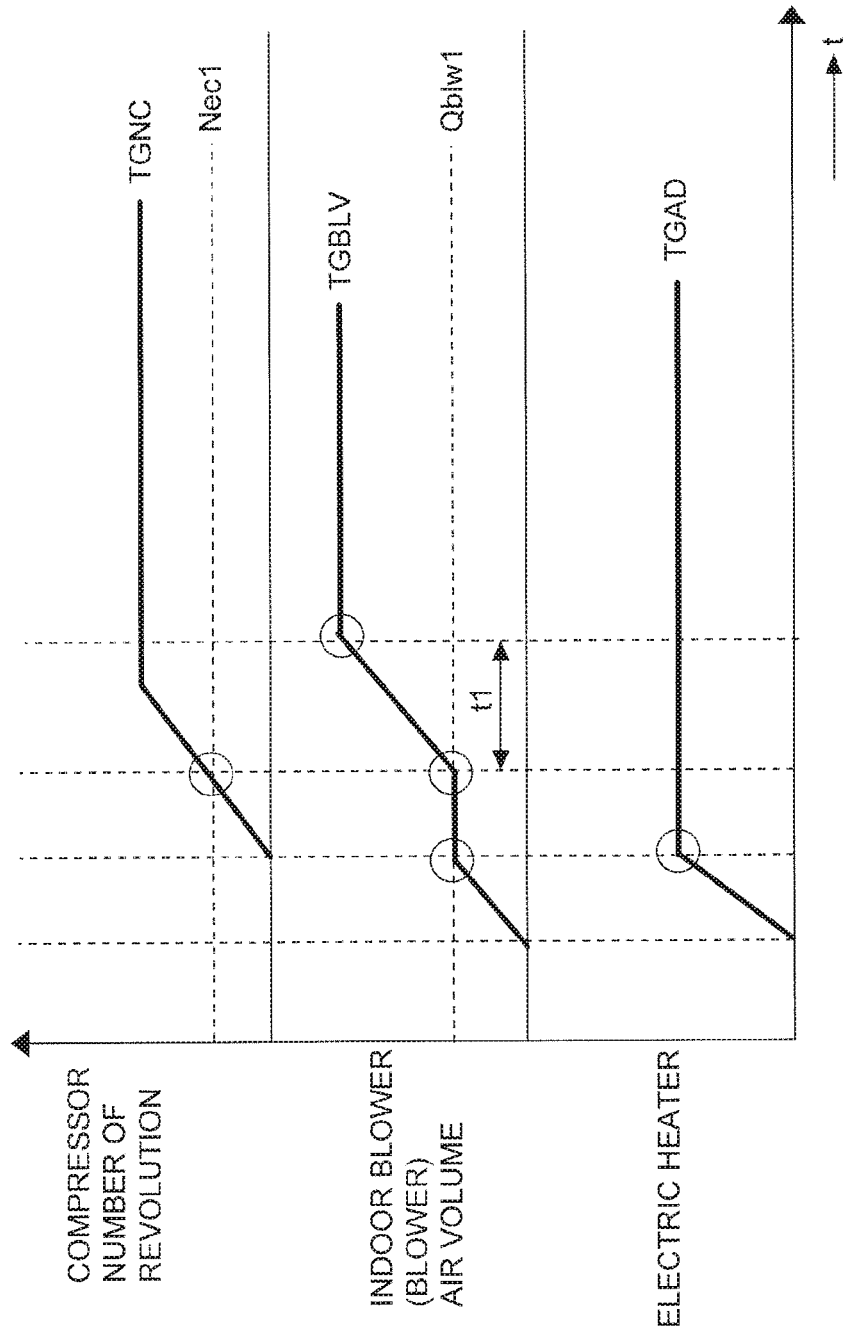

VEHICLE AIR-CONDITIONING DEVICE

CROSS-REFERENCE TO RELATED APPLICATIONS

This application is a U.S. National Stage Patent Application under 37 U.S.C. § 371 of International Patent Application No. PCT/JP2014/076664, filed on Oct. 6, 2014, which claims the benefit of Japanese Patent Application No. JP 2013-210059, filed on Oct. 7, 2013, the disclosures of which are incorporated herein by reference in their entirety.

TECHNICAL FIELD

The present invention relates to a vehicle air-conditioning device of a heat pump system which conditions air in a vehicle interior, and more particularly, it relates to a vehicle air-conditioning device which is applicable to an electric car or a hybrid car.

BACKGROUND ART

Due to actualization of environmental problems in recent years, hybrid cars and electric cars have spread. Furthermore, as an air-conditioning device which is applicable to such a vehicle, there has been developed an air-conditioning device which includes a compressor to compress and discharge a refrigerant, a radiator (an interior heat exchanger for radiation) disposed in an air flow passage of a vehicle interior to let the refrigerant radiate heat, a heat absorber (an interior heat exchanger for heat absorption) disposed in the air flow passage of the vehicle interior to let the refrigerant absorb heat, and a refrigerant circuit constituted of an outdoor heat exchanger (an exterior heat exchanger) or the like disposed outside the vehicle interior to let the refrigerant radiate heat, and the refrigerant discharged from the compressor radiates heat in the radiator and air supplied from an indoor blower (a blower fan) is heated to heat the vehicle interior (e.g., see Patent Document 1).

Additionally, in the constitution of Patent Document 1, a heater core (heat generating means) through which engine cooling water is circulated is disposed in the air flow passage of the vehicle interior, and a heating capability is also exerted by the heater core in addition to the heating by the radiator.

CITATION LIST

Patent Documents

Patent Document 1: Japanese Patent Application Publication No. 2002-211234

SUMMARY OF THE INVENTION

Problems to be Solved by the Invention

Here, in a case where start timing of the above compressor, indoor blower and heat generating means is not appropriate, various problems occur as follows. For example, when a period lengthens in which a high-temperature refrigerant is supplied to a radiator by the compressor in a windless state (the indoor blower is stopped), there occurs the disadvantage that a heat pump cycle is not established and that a high pressure side pressure abnormally increases to stop the compressor. On the other hand, when the indoor blower is operated before the radiator or the above heater core exerts a sufficient heating capability, low-temperature air is blown out to a vehicle interior, and as a result, conformity is impaired.

The present invention has been developed to solve such conventional technical problems, and an object thereof is to provide a vehicle air-conditioning device in which comfortable heating of a vehicle interior can be achieved by starting a compressor, an indoor blower and heat generating means at appropriate timing.

Means for Solving the Problems

A vehicle air-conditioning device of the present invention includes a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an indoor blower which blows the air through the air flow passage, and control means for controlling operations of the compressor and the indoor blower, the device heats the air to be supplied to the vehicle interior by heat radiated from the radiator to heat the vehicle interior, the device includes heat generating means disposed in the air flow passage to heat the air to be supplied to the vehicle interior, and the device is characterized in that the control means controls timing to start the compressor, the indoor blower and the heat generating means on the basis of an outdoor air temperature.

The vehicle air-conditioning device of the invention of claim 2 is characterized in that in the above invention, in a case of a first low outdoor air temperature environment in which the outdoor air temperature is low, the control means starts the compressor prior to the indoor blower, and starts the heat generating means simultaneously with the indoor blower, immediately after the start of the indoor blower, or after the start of the indoor blower.

The vehicle air-conditioning device of the invention of claim 3 is characterized in that in the above invention, after starting the compressor, the control means starts the indoor blower when a number of revolution of this compressor becomes a predetermined number of revolution or more, and controls an air volume of the indoor blower into a predetermined low value, and in a case where a temperature of the heat generating means becomes higher than a predetermined value, the control means increases the air volume of the indoor blower up to a target value.

The vehicle air-conditioning device of the invention of claim 4 is characterized in that in the invention of claim 2, after starting the compressor, the control means starts the indoor blower when a number of revolution of the compressor becomes a predetermined number of revolution or more or when a high pressure side pressure becomes a predetermined pressure or more, and the control means starts the heat generating means when an air volume of the indoor blower becomes a predetermined low value, and controls the air volume of the indoor blower into the predetermined low value until a temperature of this heat generating means becomes higher than a predetermined value, and in a case where the temperature of the heat generating means becomes higher than the predetermined value, the control means increases the air volume of the indoor blower up to a target value.

The vehicle air-conditioning device of the invention of claim 5 is characterized in that in the invention of claim 2, after starting the compressor, the control means starts the indoor blower when a number of revolution of the compressor becomes a predetermined number of revolution or more, and controls an air volume of the indoor blower into a predetermined low value, and in a case where the number of revolution of the compressor becomes a target number of revolution, the control means increases the air volume of the indoor blower up to a target value.

The vehicle air-conditioning device of the invention of claim 6 is characterized in that in the inventions of claim 2 to claim 5, in a case of a second low outdoor air temperature environment in which the outdoor air temperature is higher than that of the first low outdoor air temperature environment, the control means starts the indoor blower simultaneously with the compressor, immediately after the start of the compressor, or after the start of the compressor, and the control means starts the heat generating means simultaneously with the indoor blower, immediately after the start of the indoor blower, or after the start of the indoor blower.

The vehicle air-conditioning device of the invention of claim 7 is characterized in that in the above invention, after starting the indoor blower, the control means controls an air volume of the indoor blower into a predetermined low value, and in a case where a temperature of the heat generating means becomes higher than a predetermined value, the control means increases the air volume of the indoor blower up to a target value.

The vehicle air-conditioning device of the invention of claim 8 is characterized in that in the invention of claim 6, after starting the indoor blower, the control means starts the heat generating means when an air volume of the indoor blower becomes a predetermined low value, and the control means controls the air volume of the indoor blower into the predetermined low value until a temperature of the heat generating means becomes higher than a predetermined value or until a high pressure side pressure becomes a predetermined pressure or more, and in a case where the temperature of the heat generating means becomes higher than the predetermined value or in a case where the high pressure side pressure becomes the predetermined pressure or more, the control means increases the air volume of the indoor blower up to a target value.

The vehicle air-conditioning device of the invention of claim 9 is characterized in that in the invention of claim 6, after starting the indoor blower, the control means controls an air volume of the indoor blower into a predetermined low value, and starts the heat generating means when a number of revolution of the compressor becomes a predetermined number of revolution or more, and in a case where the number of revolution of the compressor becomes a target number of revolution, the control means increases the air volume of the indoor blower up to a target value.

The vehicle air-conditioning device of the invention of claim 10 is characterized in that in the inventions of claim 6 to claim 9, in a case of a third low outdoor air temperature environment in which the outdoor air temperature is higher than that of the second low outdoor air temperature environment, the control means starts the indoor blower prior to the compressor, and the control means starts the heat generating means simultaneously with the indoor blower, immediately after the start of the indoor blower, or after the start of the indoor blower.

The vehicle air-conditioning device of the invention of claim 11 is characterized in that in the above invention, after starting the indoor blower, the control means starts the compressor when an air volume of the indoor blower becomes a predetermined low value, and the control means controls the air volume of the indoor blower into the predetermined low value until a temperature of the heat generating means becomes higher than a predetermined value, and in a case where the temperature of the heat generating means becomes higher than the predetermined value, the control means increases the air volume of the indoor blower up to a target value.

The vehicle air-conditioning device of the invention of claim 12 is characterized in that in the invention of claim 10, after starting the indoor blower, the control means starts the heat generating means when an air volume of the indoor blower becomes a predetermined low value, and the control means starts the compressor simultaneously with the start of the heat generating means or immediately after the start of the heat generating means, and the control means controls the air volume of the indoor blower into the predetermined low value until a temperature of the heat generating means becomes higher than a predetermined value or until a high pressure side pressure becomes a predetermined pressure or more, and in a case where the temperature of the heat generating means becomes higher than the predetermined value or in a case where the high pressure side pressure becomes the predetermined pressure or more, the control means increases the air volume of the indoor blower up to a target value.

The vehicle air-conditioning device of the invention of claim 13 is characterized in that in the invention of claim 10, after starting the indoor blower, the control means starts the compressor when an air volume of the indoor blower becomes a predetermined low value, and the control means controls the air volume of the indoor blower into the predetermined low value until a number of revolution of the compressor becomes a predetermined number of revolution or more, and in a case where the number of revolution of the compressor becomes the predetermined number of revolution or more, the control means increases the air volume of the indoor blower up to a target value.

The vehicle air-conditioning device of the invention of claim 14 is characterized in that in the invention of claim 1, the heat generating means is disposed on a downstream side of the air flowing through the air flow passage to the radiator, and in a case of a first low outdoor air temperature environment in which the outdoor air temperature is low, the control means starts the compressor and the heat generating means prior to the indoor blower.

The vehicle air-conditioning device of the invention of claim 15 is characterized in that in the above invention, after starting the compressor, the control means starts the indoor blower when a number of revolution of the compressor becomes a predetermined number of revolution or more, and controls an air volume of the indoor blower into a predetermined low value, and in a case where the number of revolution of the compressor becomes a target number of revolution, the control means increases the air volume of the indoor blower up to a target value.

The vehicle air-conditioning device of the invention of claim 16 is characterized in that in the invention of claim 14 or claim 15, in a case of a second low outdoor air temperature environment in which the outdoor air temperature is higher than that of the first low outdoor air temperature environment, the control means starts the indoor blower and the heat generating means immediately after the start of the compressor or after the start of the compressor.

The vehicle air-conditioning device of the invention of claim 17 is characterized in that in the above invention, after starting the indoor blower, the control means controls an air volume of the indoor blower into a predetermined low value, and in a case where a number of revolution of the compressor becomes a target number of revolution, the control means increases the air volume of the indoor blower up to a target value.

The vehicle air-conditioning device of the invention of claim 18 is characterized in that in the invention of claim 16 or claim 17, in a case of a third low outdoor air temperature environment in which the outdoor air temperature is higher than that of the second low outdoor air temperature environment, the control means starts the heat generating means and the compressor immediately after the start of the indoor blower or after the start of the indoor blower.

The vehicle air-conditioning device of the invention of claim 19 is characterized in that in the above invention, after starting the indoor blower, the control means starts the compressor when an air volume of the indoor blower becomes a predetermined low value, and the control means controls the air volume of the indoor blower into the predetermined low value until a number of revolution of the compressor becomes a predetermined number of revolution or more, and in a case where the number of revolution of the compressor becomes the predetermined number of revolution or more, the control means increases the air volume of the indoor blower up to a target value.

The vehicle air-conditioning device of the invention of claim 20 is characterized in that in the above respective inventions, the heat generating means is constituted of a heating medium circulating circuit which includes a heating medium-air heat exchanger disposed in the air flow passage and circulates, through the heating medium-air heat exchanger, a heating medium heated by an electric heater or an engine.

The vehicle air-conditioning device of the invention of claim 21 is characterized in that in the above invention, the heating medium circulating circuit includes a valve unit which controls the circulation of the heating medium into the heating medium-air heat exchanger, and the control means opens the valve unit, thereby starting the heat generating means.

The vehicle air-conditioning device of a particular embodiment is characterized in that in the inventions of claim 1 to claim 19, the heat generating means is constituted of an electric heater disposed in the air flow passage to heat the air to be supplied to the vehicle interior.

Advantageous Effect of the Invention

According to the present invention, a vehicle air-conditioning device includes a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an indoor blower which blows the air through the air flow passage, and control means for controlling operations of the compressor and the indoor blower, the device heats the air to be supplied to the vehicle interior by heat radiated from the radiator to heat the vehicle interior, the device includes heat generating means disposed in the air flow passage to heat the air to be supplied to the vehicle interior, and the control means controls timing to start the compressor, the indoor blower and the heat generating means on the basis of an outdoor air temperature. Therefore, it is possible to start the compressor, the indoor blower and the heat generating means at appropriate timing in accordance with an outdoor air temperature environment.

For example, in a case of a first low outdoor air temperature environment in which the outdoor air temperature is low, as in the invention of claim 2, the control means starts the compressor prior to the indoor blower, and starts the heat generating means simultaneously with the indoor blower, immediately after the start of the indoor blower, or after the start of the indoor blower. Consequently, under the environment in which the outdoor air temperature is remarkably low, it is possible to promote rise of a high pressure side pressure of the compressor and to rapidly start up a heating capability.

In this case, as in the invention of claim 3, after starting the compressor, the control means starts the indoor blower when a number of revolution of this compressor becomes a predetermined number of revolution or more, and controls an air volume of the indoor blower into a predetermined low value, and in a case where a temperature of the heat generating means becomes higher than a predetermined value, the control means increases the air volume of the indoor blower up to a target value. Consequently, the rise of the high pressure side pressure can be promoted, a temperature rise of the heat generating means can be promoted to rapidly start up heating capabilities of the radiator and the heat generating means, and comfortable heating of the vehicle interior can be achieved.

Additionally, as in the invention of claim 4, after starting the compressor, the control means starts the indoor blower when a number of revolution of the compressor becomes a predetermined number of revolution or more or when a high pressure side pressure becomes a predetermined pressure or more, and the control means starts the heat generating means when an air volume of this indoor blower becomes a predetermined low value, and controls the air volume of the indoor blower into the predetermined low value until a temperature of this heat generating means becomes higher than a predetermined value, and in a case where the temperature of the heat generating means becomes higher than the predetermined value, the control means increases the air volume of the indoor blower up to a target value. Also in this case, the rise of the high pressure side pressure can be promoted, the temperature rise of the heat generating means can be promoted to rapidly start up the heating capabilities of the radiator and the heat generating means, and the comfortable heating of the vehicle interior can be achieved.

Particularly in this case, for example, as in the invention of claim 20, the heat generating means is constituted of a heating medium circulating circuit which includes a heating medium-air heat exchanger disposed in the air flow passage and circulates, through the heating medium-air heat exchanger, a heating medium heated by an electric heater or an engine. Furthermore, as in the invention of claim 21, the heating medium circulating circuit includes a valve unit which controls the circulation of the heating medium into the heating medium-air heat exchanger, and the control means opens the valve unit, thereby starting the heat generating means. Consequently, when a temperature of the heating medium into the heating medium-air heat exchanger rises, the valve unit is opened (the heat generating means is started). Therefore, it is possible to eliminate the disadvantage that a temperature of the air contrarily drops in the heating medium-air heat exchanger, and it is possible to effectively promote increase of the heating capability of the radiator due to the rise of the high pressure side pressure.

This is effective in a case where the heat generating means is disposed on an upstream side of the flowing air to the radiator, and it is possible to avoid the disadvantage that the temperature of the air flowing into the radiator lowers due to temperature drop in the heating medium-air heat exchanger and that the rise of the high pressure side pressure is obstructed.

Additionally, as in the invention of claim 5, after starting the compressor, the control means starts the indoor blower when a number of revolution of the compressor becomes a predetermined number of revolution or more, and controls an air volume of the indoor blower into a predetermined low value, and in a case where the number of revolution of the compressor becomes a target number of revolution, the control means increases the air volume of the indoor blower up to a target value. Also in this case, the rise of the high pressure side pressure can be promoted, the temperature rise of the heat generating means can be promoted to rapidly start up the heating capabilities of the radiator and the heat generating means, and the comfortable heating of the vehicle interior can be achieved.

On the other hand, in a case of a second low outdoor air temperature environment in which the outdoor air temperature is higher than that of the first low outdoor air temperature environment, as in the invention of claim 6, the control means starts the indoor blower simultaneously with the compressor, immediately after the start of the compressor, or after the start of the compressor, and the control means starts the heat generating means simultaneously with the indoor blower, immediately after the start of the indoor blower, or after the start of the indoor blower. Consequently, in the case where the outdoor air temperature is higher than that of the abovementioned first low outdoor air temperature environment and the rise of the high pressure side pressure is not slow as compared with the case of the first low outdoor air temperature environment, the indoor blower can more quickly be started, and the startup of the heating of the vehicle interior can be accelerated.

In this case, as in the invention of claim 7, after starting the indoor blower, the control means controls an air volume of the indoor blower into a predetermined low value, and in a case where a temperature of the heat generating means becomes higher than a predetermined value, the control means increases the air volume of the indoor blower up to a target value. Consequently, the rise of the high pressure side pressure can be promoted, and the startup of the heating of the vehicle interior can effectively be accelerated.

Additionally, as in the invention of claim 8, after starting the indoor blower, the control means starts the heat generating means when an air volume of the indoor blower becomes a predetermined low value, and the control means controls the air volume of the indoor blower into the predetermined low value until a temperature of the heat generating means becomes higher than a predetermined value or until a high pressure side pressure becomes a predetermined pressure or more, and in a case where the temperature of the heat generating means becomes higher than the predetermined value or in a case where the high pressure side pressure becomes the predetermined pressure or more, the control means increases the air volume of the indoor blower up to a target value. Also in this case, the rise of the high pressure side pressure can be promoted, and the startup of the heating of the vehicle interior can effectively be accelerated.

Particularly in this case, for example, as in the invention of claim 20, the heat generating means is constituted of a heating medium circulating circuit which includes a heating medium-air heat exchanger disposed in the air flow passage and circulates, through the heating medium-air heat exchanger, a heating medium heated by an electric heater or an engine. Furthermore, as in the invention of claim 21, the heating medium circulating circuit includes a valve unit which controls the circulation of the heating medium into the heating medium-air heat exchanger, and the control means opens the valve unit, thereby starting the heat generating means. Consequently, when the temperature of the heating medium into the heating medium-air heat exchanger rises, the valve unit is opened (the heat generating means is started). Therefore, it is similarly possible to eliminate the disadvantage that the temperature of the air contrarily drops in the heating medium-air heat exchanger, and it is possible to effectively promote the increase of the heating capability of the radiator due to the rise of the high pressure side pressure.

This is similarly effective in the case where the heat generating means is disposed on the upstream side of the flowing air to the radiator, and it is possible to avoid the disadvantage that the temperature of the air flowing into the radiator lowers due to the temperature drop in the heating medium-air heat exchanger and that the rise of the high pressure side pressure is obstructed.

Additionally, as in the invention of claim 9, after starting the indoor blower, the control means controls an air volume of the indoor blower into a predetermined low value, and starts the heat generating means when a number of revolution of the compressor becomes a predetermined number of revolution or more, and in a case where the number of revolution of the compressor becomes a target number of revolution, the control means increases the air volume of the indoor blower up to a target value. Also in this case, the rise of the high pressure side pressure can be promoted, and the startup of the heating of the vehicle interior can effectively be accelerated.

On the other hand, in a case of a third low outdoor air temperature environment in which the outdoor air temperature is further higher than that of the second low outdoor air temperature environment, as in the invention of claim 10, the control means starts the indoor blower prior to the compressor, and the control means starts the heat generating means simultaneously with the indoor blower, immediately after the start of the indoor blower, or after the start of the indoor blower. Consequently, under the environment in which the outdoor air temperature is further higher than that of the second low outdoor air temperature environment, the disadvantage that the high pressure side pressure rises in early stages to cause stop of the compressor or the like can be avoided in advance, and the heating of the vehicle interior can smoothly be started.

In this case, as in the invention of claim 11, after starting the indoor blower, the control means starts the compressor when an air volume of the indoor blower becomes a predetermined low value, and the control means controls the air volume of the indoor blower into the predetermined low value until a temperature of the heat generating means becomes higher than a predetermined value, and in a case where the temperature of the heat generating means becomes higher than the predetermined value, the control means increases the air volume of the indoor blower up to a target value. Consequently, the startup of the heating of the vehicle interior can rapidly and smoothly be performed while avoiding a disadvantage due to excessive rise of the high pressure side pressure.

Additionally, as in the invention of claim 12, after starting the indoor blower, the control means starts the heat generating means when an air volume of the indoor blower becomes a predetermined low value, and the control means starts the compressor simultaneously with the start of the heat generating means or immediately after the start of the heat generating means, and the control means controls the air volume of the indoor blower into the predetermined low value until a temperature of the heat generating means becomes higher than a predetermined value or until a high pressure side pressure becomes a predetermined pressure or more, and in a case where the temperature of the heat generating means becomes higher than the predetermined value or in a case where the high pressure side pressure becomes the predetermined pressure or more, the control means increases the air volume of the indoor blower up to a target value. Also in this case, the startup of the heating of the vehicle interior can rapidly and smoothly be performed while avoiding the disadvantage due to the excessive rise of the high pressure side pressure.

Particularly in this case, for example, as in the invention of claim 20, the heat generating means is constituted of a heating medium circulating circuit which includes a heating medium-air heat exchanger disposed in the air flow passage and circulates, through the heating medium-air heat exchanger, a heating medium heated by an electric heater or an engine. Furthermore, as in the invention of claim 21, the heating medium circulating circuit includes a valve unit which controls the circulation of the heating medium into the heating medium-air heat exchanger, and the control means opens the valve unit, thereby starting the heat generating means. Consequently, when the temperature of the heating medium into the heating medium-air heat exchanger rises, the valve unit is opened (the heat generating means is started). Therefore, it is similarly possible to eliminate the disadvantage that the temperature of the air drops in the heating medium-air heat exchanger, and it is possible to effectively promote the increase of the heating capability of the radiator due to the rise of the high pressure side pressure.

This is similarly effective in the case where the heat generating means is disposed on the upstream side of the flowing air to the radiator, and it is possible to avoid the disadvantage that the temperature of the air flowing into the radiator lowers due to the temperature drop in the heating medium-air heat exchanger and that the rise of the high pressure side pressure is obstructed.

Additionally, as in the invention of claim 13, after starting the indoor blower, the control means starts the compressor when an air volume of the indoor blower becomes a predetermined low value, and the control means controls the air volume of the indoor blower into the predetermined low value until a number of revolution of the compressor becomes a predetermined number of revolution or more, and in a case where the number of revolution of the compressor becomes the predetermined number of revolution or more, the control means increases the air volume of the indoor blower up to a target value. Also in this case, the startup of the heating of the vehicle interior can rapidly and smoothly be performed while avoiding the disadvantage due to the excessive rise of the high pressure side pressure.

Additionally, in a case where the heat generating means is disposed on a downstream side of the air flowing through the air flow passage to the radiator, heat generated by the heat generating means is not transmitted to the radiator even when the indoor blower is started, but in a case of a first low outdoor air temperature environment in which the outdoor air temperature is low, as in the invention of claim 14, the control means starts the compressor and the heat generating means prior to the indoor blower. Consequently, under the environment in which the outdoor air temperature is remarkably low, both the rise of the high pressure side pressure of the compressor and the rise of the temperature of the heat generating means can be promoted, and the heating capability can rapidly be started up.

In this case, as in the invention of claim 15, after starting the compressor, the control means starts the indoor blower when a number of revolution of the compressor becomes a predetermined number of revolution or more, and controls an air volume of the indoor blower into a predetermined low value, and in a case where the number of revolution of the compressor becomes a target number of revolution, the control means increases the air volume of the indoor blower up to a target value. Consequently, the rise of the high pressure side pressure can be promoted, the temperature rise of the heat generating means can be promoted to rapidly start up the heating capabilities of the radiator and the heat generating means, and the comfortable heating of the vehicle interior can be achieved.

On the other hand, in a case of a second low outdoor air temperature environment in which the outdoor air temperature is higher than that of the first low outdoor air temperature environment, as in the invention of claim 16, the control means starts the indoor blower and the heat generating means immediately after the start of the compressor or after the start of the compressor. Consequently, in the case where the outdoor air temperature is higher than that of the abovementioned first low outdoor air temperature environment and the rise of the high pressure side pressure is not slow as compared with the case of the first low outdoor air temperature environment, the indoor blower can more quickly be started, and the startup of the heating of the vehicle interior can be accelerated.

In this case, as in the invention of claim 17, after starting the indoor blower, the control means controls an air volume of the indoor blower into a predetermined low value, and in a case where a number of revolution of the compressor becomes a target number of revolution, the control means increases the air volume of the indoor blower up to a target value. Consequently, the rise of the high pressure side pressure can be promoted, and the startup of the heating of the vehicle interior can effectively be accelerated.

On the other hand, in a case of a third low outdoor air temperature environment in which the outdoor air temperature is higher than that of the second low outdoor air temperature environment, as in the invention of claim 18, the control means starts the heat generating means and the compressor immediately after the start of the indoor blower or after the start of the indoor blower. Consequently, under the environment in which the outdoor air temperature is further higher than that of the second low outdoor air temperature environment, the disadvantage that the high pressure side pressure rises in the early stages to cause the stop of the compressor or the like can be avoided in advance, and the heating of the vehicle interior can smoothly be started.

In this case, as in the invention of claim 19, after starting the indoor blower, the control means starts the compressor when an air volume of the indoor blower becomes a predetermined low value, and the control means controls the air volume of the indoor blower into the predetermined low value until a number of revolution of the compressor becomes a predetermined number of revolution or more, and in a case where the number of revolution of the compressor becomes the predetermined number of revolution or more, the control means increases the air volume of the indoor blower up to a target value. Consequently, the startup of the heating of the vehicle interior can rapidly and smoothly be performed while avoiding the disadvantage due to the excessive rise of the high pressure side pressure.

The abovementioned invention is effective in a case where as in the invention of claim 20, the heat generating means is constituted of a heating medium circulating circuit which includes a heating medium-air heat exchanger disposed in the air flow passage and circulates, through the heating medium-air heat exchanger, a heating medium heated by an electric heater or an engine. Furthermore, as in the invention of claim 21, the heating medium circulating circuit includes a valve unit which controls the circulation of the heating medium into the heating medium-air heat exchanger, and the control means opens the valve unit, thereby starting the heat generating means. As described above, when the temperature of the heating medium into the heating medium-air heat exchanger rises, the valve unit is opened (the heat generating means is started), and it is possible to eliminate the disadvantage that the temperature of the air drops in the heating medium-air heat exchanger.

Additionally, when the heat generating means is constituted of an electric heater disposed in the air flow passage to heat the air to be supplied to the vehicle interior as in particular embodiment disclosed herein, so that it is possible to simplify a structure.

BRIEF DESCRIPTION OF THE DRAWINGS

FIG. 21 is still another timing chart to explain the control of the compressor, the indoor blower and the electric heater by the controller of FIG. 2 in the case of FIG. 18 (Embodiment 4).

MODE FOR CARRYING OUT THE INVENTION

Hereinafter, embodiments of the present invention will be described in detail with reference to the drawings.

Embodiment 1

Figure 1:
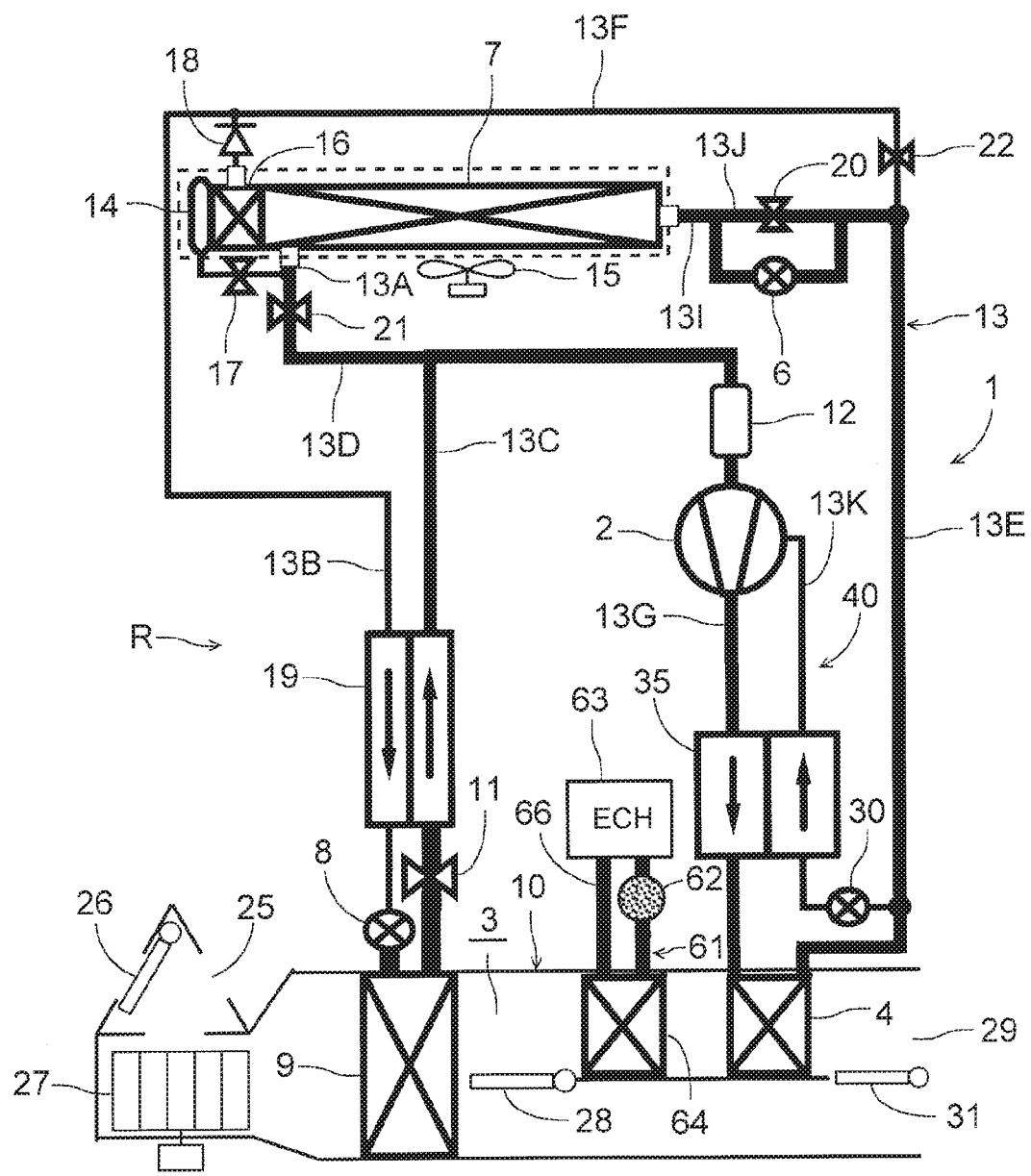
FIG. 1 is a constitutional view of a vehicle air-conditioning device of one embodiment to which the present invention is applied (Embodiment 1)

FIG. 1 shows a constitutional view of a vehicle air-conditioning device 1 of one embodiment of the present invention. In this case, a vehicle of the embodiment to which the present invention is applied is an electric car (EV) which does not have an engine (an internal combustion engine), a so-called hybrid car in which the engine is used together with an electric motor for running and in which the electric motor for running is driven to run or auxiliarily run with a power charged in a battery (which is not shown in the drawings), or a usual car which runs with the engine.

Additionally, the vehicle air-conditioning device 1 of the present invention is driven by the power of the battery or the like (an external power in a case where plug-in is possible). That is, the vehicle air-conditioning device 1 of the embodiment performs heating of a vehicle interior by a heat pump operation in which an electric type of compressor constituting a refrigerant circuit is driven with the battery or the like, and further, the device selectively executes respective operation modes of dehumidifying and heating, cooling and dehumidifying, cooling, and the like.

The vehicle air-conditioning device 1 of this embodiment performs air conditioning (heating, cooling, dehumidifying, and ventilation) of the vehicle interior in the car, and there are successively connected, by a refrigerant pipe 13, an electric type of compressor (an electric compressor) 2 which compresses a refrigerant, a radiator 4 disposed in an air flow passage 3 of an HVAC unit 10 in which vehicle interior air is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 on an upstream side of air flowing through the air flow passage 3 to the radiator 4 to let the refrigerant absorb heat from interior and exterior of the vehicle during the cooling and during the dehumidifying, an evaporation capability control valve 11 which adjusts an evaporation capability in the heat absorber 9, an accumulator 12 and the like, so that a refrigerant circuit R is constituted. It is to be noted that in the outdoor heat exchanger 7, an outdoor blower 15 is disposed which performs the heat exchange between the outdoor air and the refrigerant.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected in parallel with the outdoor expansion valve 6, and in the bypass pipe 13J, there is disposed a solenoid valve (an opening/closing valve) 20 which is opened in a cooling mode and bypasses the outdoor expansion valve 6 to pass the refrigerant.

Additionally, the refrigerant pipe 13E immediately after the pipe is extended out from the radiator 4 (before the pipe is branched into the refrigerant pipe 13F and a refrigerant pipe 13I) is branched, and this branched refrigerant pipe 13K communicates to be connected to the middle of compression by the compressor 2 via an injection expansion valve 30 constituted of an electric valve for injection control. Further, the refrigerant pipe 13K between an outlet side of the injection expansion valve 30 and the compressor 2 is disposed in a heat exchange relation with a refrigerant pipe 13G positioned on a discharge side of the compressor 2, and both the pipes constitute a discharge side heat exchanger 35.

The refrigerant pipe 13K, the injection expansion valve 30 and the discharge side heat exchanger 35 constitute an injection circuit 40. The injection circuit 40 is a circuit which distributes a part of the refrigerant flowing out from the radiator 4 to return the part of the refrigerant to the middle of the compression by the compressor 2 (gas injection), and the injection expansion valve 30 decompresses the refrigerant flowing into the refrigerant pipe 13K, and then the refrigerant flows into the discharge side heat exchanger 35. The refrigerant flowing into the discharge side heat exchanger 35 is discharged from the compressor 2 to the refrigerant pipe 13G, performs heat exchange with the refrigerant before flowing into the radiator 4, and absorbs heat from the refrigerant flowing through the refrigerant pipe 13G to evaporate. In the discharge side heat exchanger 35, the refrigerant distributed to the refrigerant pipe 13K evaporates, whereby the gas injection into the compressor 2 is performed.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3 through which the air flows.

Additionally, in the air flow passage 3 on the air upstream side of the radiator 4, an air mix damper 28 is disposed to adjust a degree of flow of the indoor air or the outdoor air through the radiator 4. Furthermore, in the air flow passage 3 on an air downstream side of the radiator 4, there is formed each outlet (represented by an outlet 29 in FIG. 1) of foot, vent or defroster, and in the outlet 29, an outlet changing damper 31 is disposed to perform changing control of blowing of the air from each outlet mentioned above.

Additionally, in FIG. 1, reference numeral 61 indicates a heating medium circulating circuit as heat generating means disposed in the vehicle air-conditioning device 1 of the embodiment. The heating medium circulating circuit 61 includes a circulating pump 62 constituting circulating means, a heating medium heating electric heater (shown by ECH in the drawing) 63, and a heating medium-air heat exchanger 64 disposed in the air flow passage 3 on an upstream side of the air flowing through the air flow passage 3 to the radiator 4, and these components are successively annularly connected to one another by a heating medium pipe 66. It is to be noted that as the heating medium to be circulated in the heating medium circulating circuit 61, for example, water, a refrigerant such as HFO-1234yf, a coolant or the like is employed.

Further, when the circulating pump 62 is operated and the heating medium heating electric heater 63 is energized to generate heat, the heating medium heated by the heating medium heating electric heater 63 is circulated through the heating medium-air heat exchanger 64 in the air flow passage 3. That is, the heating medium-air heat exchanger 64 of the heating medium circulating circuit 61 performs a function of a so-called heater core, and contributes to the heating of the vehicle interior. When the heating medium circulating circuit 61 is employed, electric safety of a passenger can improve.

Figure 2:
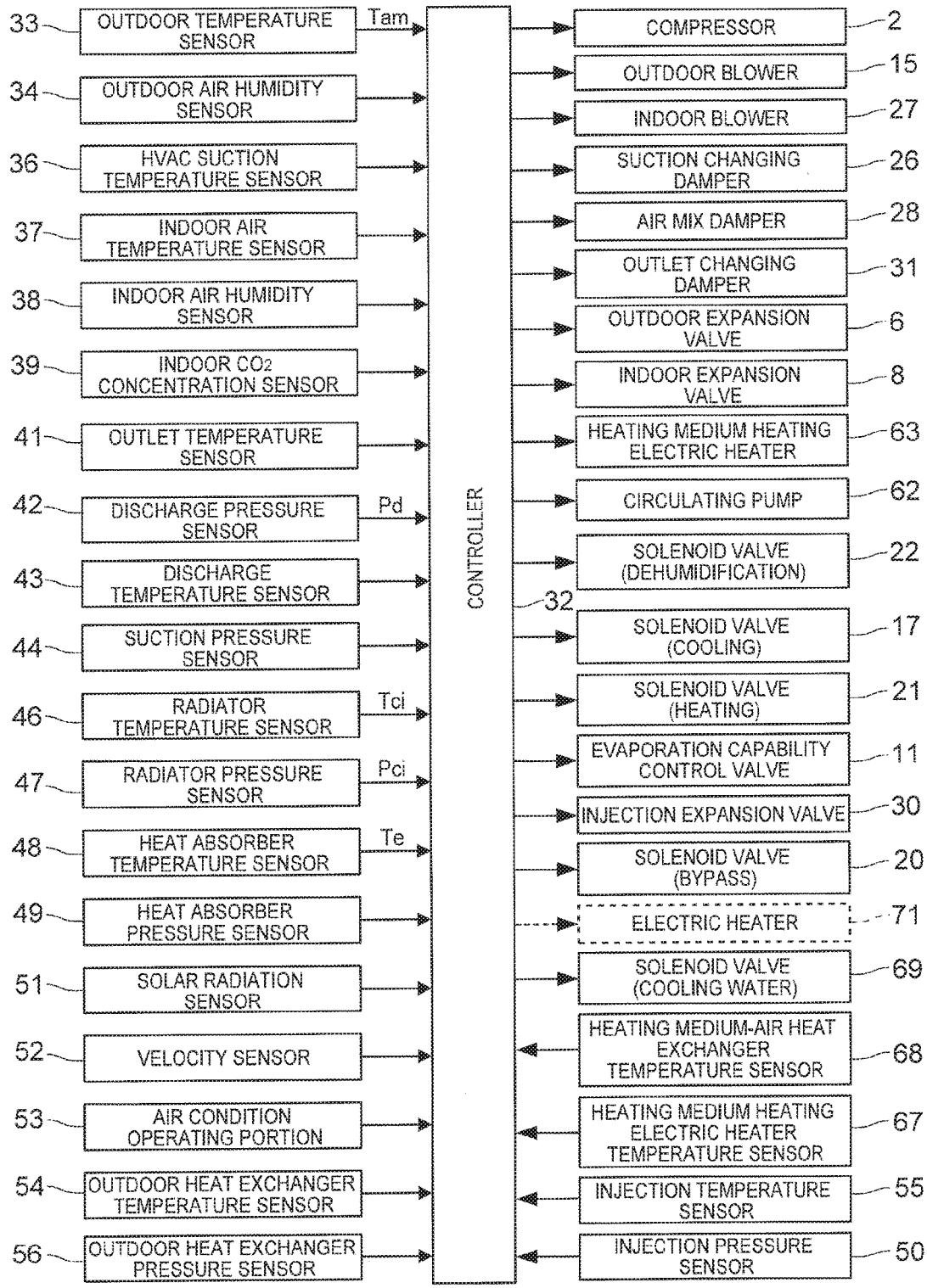
FIG. 2 is a block diagram of an electric circuit of a controller of the vehicle air-conditioning device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4, the temperature of the radiator 4 itself or the temperature of the air which has just been heated in the radiator 4), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the air passed through the heat absorber 9, the temperature of the heat absorber 9 itself, or the temperature of the air which has just been cooled in the heat absorber 9), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

Additionally, the input of the controller 32 is further connected to respective outputs of an injection pressure sensor 50 which detects a pressure of an injection refrigerant flowing into the refrigerant pipe 13K of the injection circuit 40 and flowing through the discharge side heat exchanger 35 to return to the middle of the compression by the compressor 2, and an injection temperature sensor 55 which detects a temperature of the injection refrigerant.

Furthermore, the input of the controller 32 is further connected to respective outputs of a heating medium heating electric heater temperature sensor 67 which detects a temperature of the heating medium heating electric heater 63 of the heating medium circulating circuit 61 (the temperature of the heating medium immediately after heated by the heating medium heating electric heater 63 or a temperature of an unshown electric heater itself included in the heating medium heating electric heater 63), and a heating medium-air heat exchanger temperature sensor 68 which detects a temperature of the heating medium-air heat exchanger 64 (the temperature of the air passed through the heating medium-air heat exchanger 64 or the temperature of the heating medium-air heat exchanger 64 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the injection expansion valve 30, the evaporation capability control valve 11, the heating medium heating electric heater 63 and the circulating pump 62. Further, the controller 32 controls these components on the basis of the outputs of the respective sensors and the setting input by the air conditioning operating portion 53.

Next, an operation of the vehicle air-conditioning device 1 of the embodiment having the abovementioned constitution will be described. The controller 32 changes and executes respective roughly divided operation modes such as a heating mode, a dehumidifying and heating mode, an internal cycle mode, a dehumidifying and cooling mode, and a cooling mode. First, flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Further, the compressor 2 and the respective blowers 15 and 27 are operated, and the air mix damper 28 has a state where the air blown out from the indoor blower 27 is passed through the heating medium-air heat exchanger 64 and the radiator 4. In consequence, a high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then a part of the refrigerant is distributed to the refrigerant pipe 13K of the injection circuit 40, and mainly flows through the refrigerant pipe 13E to reach the outdoor expansion valve 6. It is to be noted that an operation and a function of the injection circuit 40 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (a heat pump). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating of the vehicle interior is performed.

Additionally, in a case where the controller 32 judges that a heating capability by the radiator 4 runs short in this heating mode as described later, the heating medium heating electric heater 63 is energized to generate heat, and the circulating pump 62 is operated to execute the heating by the heating medium circulating circuit 61. In this case, the air heated in the heating medium-air heat exchanger 64 and further heated in the radiator 4 is blown out from the outlet 29, and hence the heating of the vehicle interior is performed.

As described later in the embodiment, the controller 32 controls a number of revolution of the compressor 2 on the basis of a high pressure of the refrigerant circuit R which is detected by the radiator pressure sensor 47 (or the discharge pressure sensor 42), also controls a valve position of the outdoor expansion valve 6 on the basis of a volume of the air passed through the radiator 4 and a target outlet temperature, and controls a subcool degree of the refrigerant in the outlet of the radiator 4. It is to be noted that the valve position of the outdoor expansion valve 6 may be controlled on the basis of a temperature of the radiator 4 or an outdoor air temperature in place of or in addition to the above parameters.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating of the vehicle interior are performed.

The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48. It is to be noted that in this dehumidifying and heating mode, gas injection by the injection circuit 40 is not performed, and hence the injection expansion valve 30 is shut off (a shut off position). Additionally, the heating medium circulating circuit 61 is not also performed.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating of the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2. It is to be noted that also in this internal cycle mode, the gas injection by the injection circuit 40 is not performed, and hence the injection expansion valve 30 is shut off (the shut off position). Additionally, the heating medium circulating circuit 61 is not also operated.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Further, the compressor 2 and the respective blowers 15 and 27 are operated, and the air mix damper 28 has the state where the air blown out from the indoor blower 27 is passed through the heating medium-air heat exchanger 64 and the radiator 4. In consequence, the high-temperature high-pressure gas refrigerant discharged from the compressor 2 flows through the discharge side heat exchanger 35 into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling of the vehicle interior are performed.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure Pci) of the radiator 4. It is to be noted that also in this dehumidifying and cooling mode, the gas injection by the injection circuit 40 is not performed, and hence the injection expansion valve 30 is shut off (the shut off position). Additionally, the heating medium circulating circuit 61 is not also operated.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling)), and the air mix damper 28 has a state where the air is not passed through the heating medium-air heat exchanger 64 and the radiator 4. In consequence, the high-temperature high-pressure gas refrigerant discharged from the compressor 2 flows through the discharge side heat exchanger 35 to flow into the radiator 4. The air in the air flow passage 3 is not passed through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, and hence cooling of the vehicle interior is performed. In this cooling mode, the controller 32 controls the number of revolution of the compressor 2 on the basis of the temperature of the heat absorber 9 which is detected by the heat absorber temperature sensor 48. It is to be noted that also in this cooling mode, the gas injection by the injection circuit 40 is not performed, and hence the injection expansion valve 30 is shut off (the shut off position). Additionally, the heating medium circulating circuit 61 is not also operated.

(6) Changing Control of Operation Modes

On startup, the controller 32 selects the operation mode on the basis of an outdoor air temperature Tam detected by the outdoor air temperature sensor 33 and a target outlet temperature TAO. Additionally, after the startup, the controller selects and changes the above respective operation modes in accordance with a change of an environment or setting conditions of the outdoor air temperature Tam, the target outlet temperature TAO or the like. In this case, the controller 32 basically shifts from the heating mode to the dehumidifying and heating mode or from the dehumidifying and heating mode to the heating mode, shifts from the dehumidifying and heating mode to the dehumidifying and cooling mode or from the dehumidifying and cooling mode to the dehumidifying and heating mode, and shifts from the dehumidifying and cooling mode to the cooling mode or from the cooling mode to the dehumidifying and cooling mode, but when the controller shifts from the dehumidifying and heating mode to the dehumidifying and cooling mode and shifts from the dehumidifying and cooling mode to the dehumidifying and heating mode, the controller shifts via the above internal cycle mode. Additionally, the controller might shift from the cooling mode to the internal cycle mode or from the internal cycle mode to the cooling mode.

(7) Gas Injection in Heating Mode

Next, the gas injection in the heating mode will be described. The refrigerant, which flows out from the radiator 4 to enter the refrigerant pipe 13E and is then distributed to flow into the refrigerant pipe 13K of the injection circuit 40, is decompressed by the injection expansion valve 30 to enter the discharge side heat exchanger 35, performs therein heat exchange with the refrigerant discharged from the compressor 2 (the refrigerant discharged from the compressor 2 before flowing into the radiator 4), and absorbs heat to evaporate. Afterward, the evaporated gas refrigerant is further compressed together with the refrigerant which returns to the middle of the compression by the compressor 2 and is sucked from the accumulator 12 to be compressed, and then the refrigerant is discharged from the compressor 2 to the refrigerant pipe 13G again.

When the refrigerant is returned from the injection circuit 40 to the middle of the compression by the compressor 2, an amount of the refrigerant to be discharged from the compressor 2 increases, and hence the heating capability in the radiator 4 improves. However, when a liquid refrigerant returns to the compressor 2, liquid compression is caused, and hence the refrigerant to be returned from the injection circuit 40 to the electric compressor 2 has to be a gas.

Therefore, the controller 32 monitors a superheat degree of the refrigerant toward the middle of the compression by the compressor 2 from the pressure and the temperature of the refrigerant after the discharge side heat exchanger 35 which are detected by the injection pressure sensor 50 and the injection temperature sensor 55, respectively, and the controller controls the valve position of the injection expansion valve 30 so that a predetermined superheat degree is applied in the heat exchange with the discharged refrigerant. However, in the embodiment, the discharge side heat exchanger 35 performs heat exchange between the remarkably high-temperature refrigerant discharged from the compressor 2 before flowing into the radiator 4 and the refrigerant flowing through the injection circuit 40, and hence a large heat exchange amount can be obtained. Therefore, even when the valve position of the injection expansion valve 30 is increased to increase an injection amount, the refrigerant can sufficiently evaporate in the discharge side heat exchanger 35, and a required superheat degree can be obtained.

In consequence, as compared with a conventional case where heat exchange is performed between the refrigerant after the radiator and the injection refrigerant, a gas injection amount to the compressor 2 can sufficiently be acquired, and the amount of the refrigerant to be discharged from the compressor 2 can be increased to achieve the improvement of the heating capability.

(8) Control of Compressor, Indoor Blower and Heating Medium Circulating Circuit in Heating Mode In the heating mode in which heat is radiated from the radiator 4 to heat the vehicle interior (the dehumidifying and heating mode is also included), the controller 32 determines a compressor target number of revolution TGNC (the target number of revolution) of the compressor 2 on the basis of a radiator target pressure PCO (a target value of the high pressure), and controls the compressor 2 so that a number of revolution NC of the compressor 2 becomes the compressor target number of revolution TGNC. Additionally, the controller determines a target blower voltage TGBLV (a target value of an air volume) of the indoor blower 27 on the basis of the target outlet temperature TAO or the like, and controls the indoor blower 27 so that a blower voltage BLV of the indoor blower 27 becomes the target blower voltage TGBLV. The target blower voltage TGBLV becomes a target value of the air volume of the indoor blower 27.

It is to be noted that the target outlet temperature TAO defined as a target value of the temperature of the air to be blown out from the outlet 29 to the vehicle interior is calculated from Equation (I) mentioned below by the controller 32.

$$TAO=(Tset-Tin)\times K+Tbal(f(Tset,SUN,Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tba1 is a balance value calculated from the predetermined temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes.

Additionally, the controller 32 calculates a target heating capability (a required heating capability) Qtgt which is the required heating capability of the radiator 4, and a maximum heating capability estimated value Qhp which can be generated in the radiator 4, by use of Equation (II) and Equation (III).

$$Qtgt=(TCO-Te)\times Cpa\times \rho \times Qair \quad (II), \text{ and}$$

$$Qhp=f(Tam,NC,BLV,VSP,Te) \quad (III),$$

in which Te is the temperature of the heat absorber 9 which is detected by the heat absorber temperature sensor 48, Cpa is specific heat [kj/kg·K] of the air flowing into the radiator 4, $\rho$ is a density (a specific volume) [kg/m$^3$] of the air flowing into the radiator 4, Qair is a volume [m$^3$/h] of the air passing the radiator 4 (the passing air Qair is estimated from the blower voltage BLV of the indoor blower 27 or the like), and VSP is a velocity which can be obtained from the velocity sensor 52.

In Equation (II) mentioned above, the temperature of the air flowing into the radiator 4 or the temperature of the air flowing out from the radiator 4 may be employed in place of or in addition to Qair. Additionally, the number of revolution NC of the compressor 2 of Equation (III) is one example of an index indicating a refrigerant flow rate, the blower voltage BLV is one example of an index indicating the volume of the air in the air flow passage 3, and the heating capability estimated value Qhp is calculated from functions of these indexes. Additionally, the value may be calculated from these indexes, and one of an outlet refrigerant pressure of the radiator 4, an outlet refrigerant temperature of the radiator 4, an inlet refrigerant pressure of the radiator 4 and an inlet refrigerant temperature of the radiator 4, or any combination of them.

Figure 3:
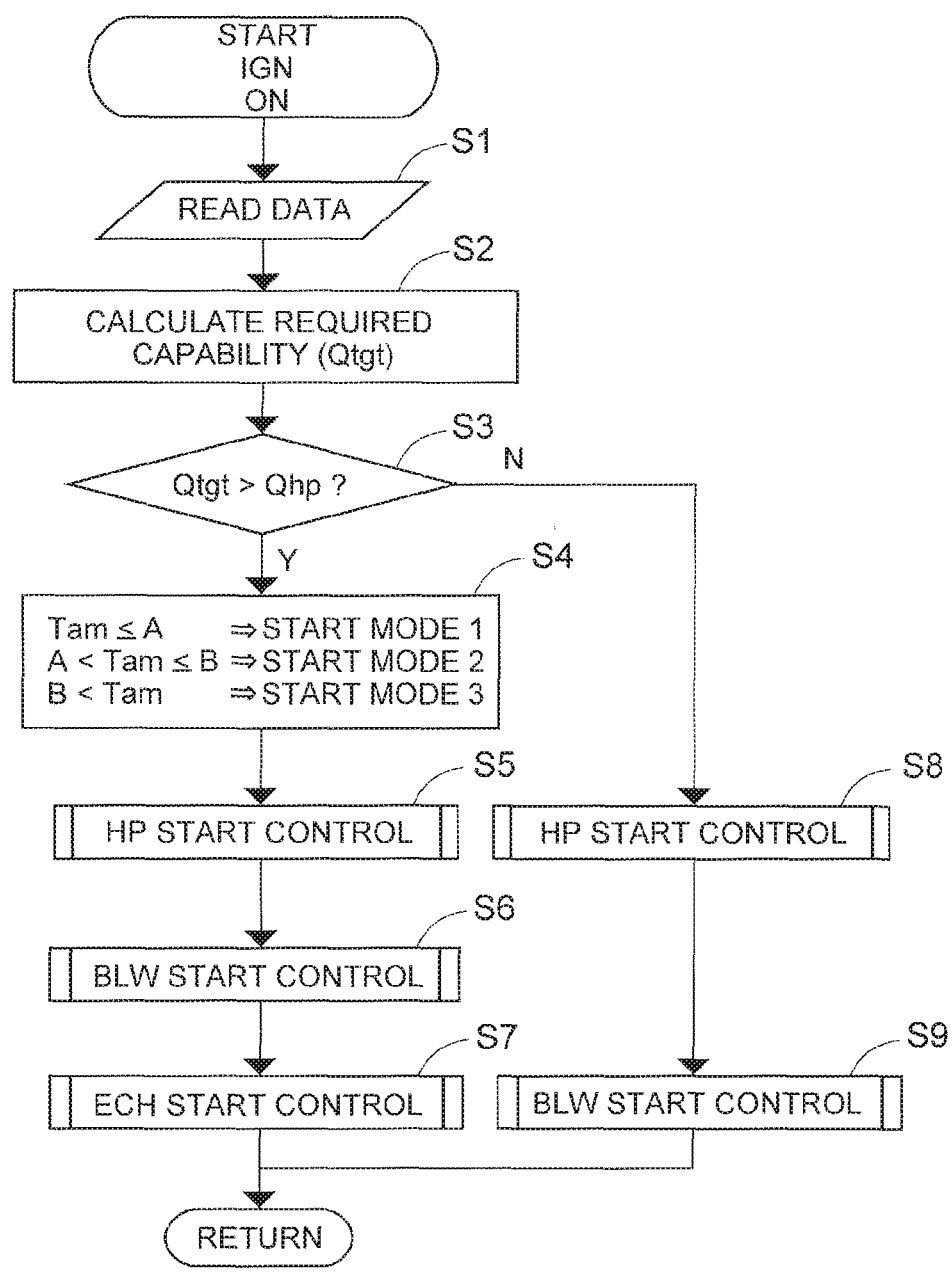
FIG. 3 is a flowchart to explain an operation of the controller of FIG. 2.

Next, the controller 32 determines whether or not to operate the heating medium circulating circuit 61 as in a flowchart of FIG. 3, on the basis of the target heating capability (the required heating capability) Qtgt mentioned above, and the HP maximum heating capability estimated value Qhp. That is, when a car is started (IGN ON), the controller 32 reads data from each sensor in step S1, calculates the target heating capability Qtgt by use of Equation (II) mentioned above in step S2, calculates the heating capability estimated value Qhp by use of Equation (III) mentioned above, and judges in step S3 whether or not the target heating capability Qtgt is larger than the heating capability estimated value Qhp.

In a case where the target heating capability Qtgt is larger than the heating capability estimated value Qhp in the step S3, the controller advances to step S4 to select a start mode of the compressor 2, the indoor blower 27 and the heating medium circulating circuit (the heat generating means) 61, and starts and controls the compressor 2, the indoor blower 27 and the heating medium circulating circuit 61 (the heat generating means in this case which is constituted of the heating medium heating electric heater 63 and the circulating pump 62) on the basis of the selected start mode in step S5 to step S7. It is to be noted that the selection of the start mode in the step S4 mentioned above will be described later.

Additionally, in a case where the target heating capability Qtgt is not more than the heating capability estimated value Qhp in the step S3, the controller 32 starts and controls the compressor 2 and the indoor blower 27 in step S8 and step S9. That is, in the case where the target heating capability Qtgt is larger than the heating capability estimated value Qhp, the controller 32 judges that the heating capability of the radiator 4 runs short, and operates the heating medium circulating circuit 61, and in the case where the target heating capability Qtgt is not more than the heating capability estimated value Qhp, the controller judges that the heating capability of the radiator 4 suffices, and the heating medium circulating circuit 61 is not operated.

(8-1) Start Timing of Compressor, Indoor Blower and Heating Medium Circulating Circuit in Heating Mode Next, there will be described the selection of the start mode of the compressor 2, the indoor blower 27 and the heating medium circulating circuit 61 in the step S4 of FIG. 3. In the embodiment, the controller 32 has three types of start modes of start modes 1 to 3, and changes these modes on the basis of the outdoor air temperature Tam detected by the outdoor air temperature sensor 33.

In this case, the controller 32 selects the start mode 1 in a case of a first low outdoor air temperature environment in which the outdoor air temperature Tam is not more than a predetermined remarkably low temperature A (a first threshold value). In this start mode 1, the controller 32 starts the compressor 2 prior to the indoor blower 27, and starts the heating medium circulating circuit 61 simultaneously with the indoor blower 27, immediately after the start of the indoor blower or after the start of the indoor blower (respective embodiments described later are included).

Additionally, in a case of a second low outdoor air temperature environment in which the outdoor air temperature Tam is higher than the remarkably low temperature A mentioned above, and is not more than a predetermined low temperature B (a second threshold value) higher than the remarkably low temperature A (the temperature of the second low outdoor air temperature environment is higher than that of the first low outdoor air temperature environment), the controller selects the start mode 2. In the start mode 2, the controller 32 starts the indoor blower 27 simultaneously with the compressor 2, immediately after the start of the compressor or after the start of the compressor, and starts the heating medium circulating circuit 61 simultaneously with the indoor blower 27, immediately after the start of the indoor blower or after the start of the indoor blower (the respective embodiments described later are included).

Furthermore, in a case of a third low outdoor air temperature environment in which the outdoor air temperature Tam is higher than the low temperature B mentioned above (a temperature of the third low outdoor air temperature environment is higher than that of the second low outdoor air temperature environment), the controller selects the start mode 3. In the start mode 3, the controller 32 starts the indoor blower 27 prior to the compressor 2, and starts the heating medium circulating circuit 61 simultaneously with the indoor blower 27, immediately after the start of the indoor blower, or after the start of the indoor blower (the respective embodiments described later are included).

Next, the respective start modes will be described in detail with reference to FIG. 4 to FIG. 6.

(8-2) Start Mode 1 (Embodiment 1)

Figure 4:
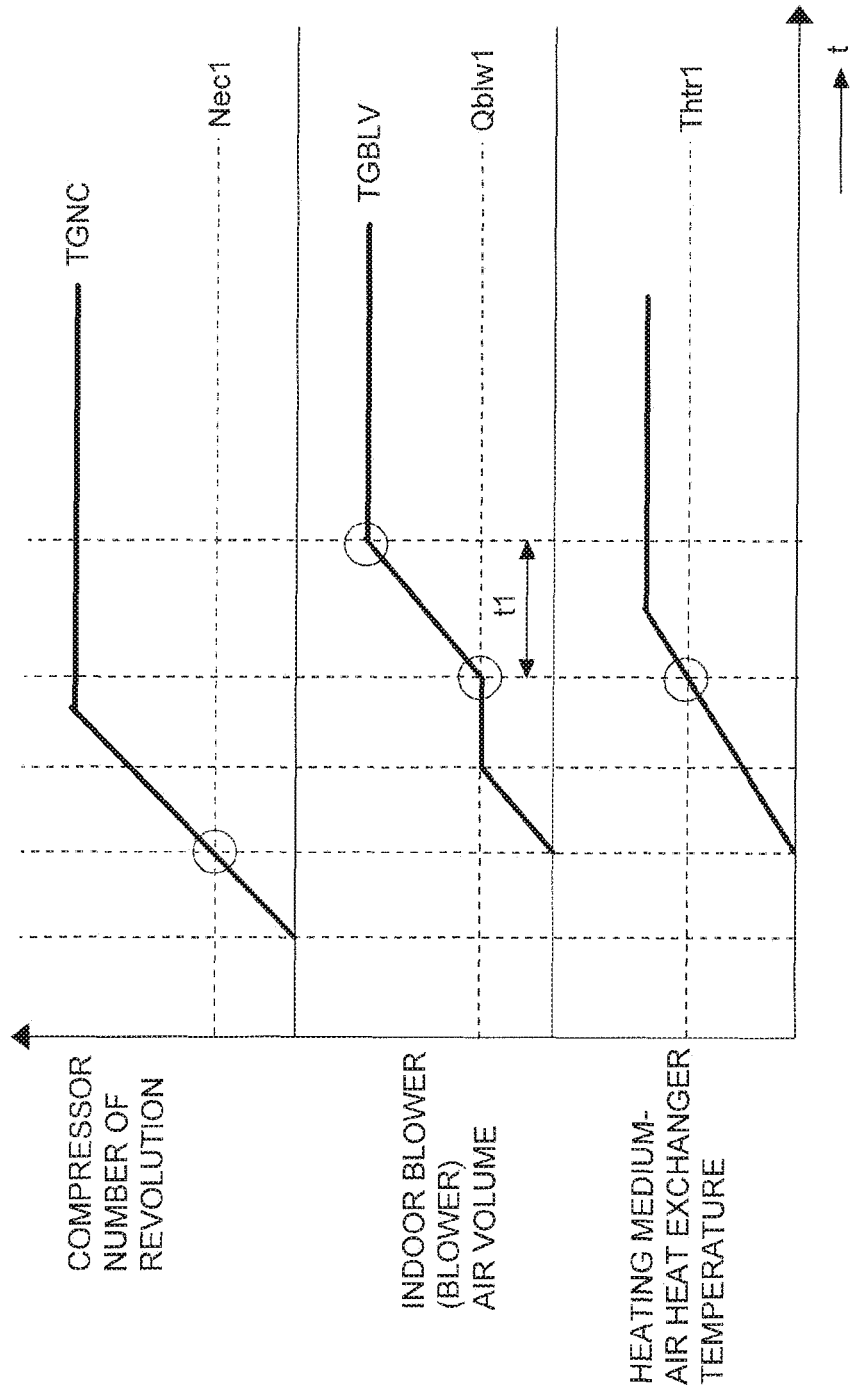
FIG. 4 is a timing chart to explain control of a compressor, an indoor blower and a heating medium circulating circuit by the controller of FIG. 2 (Embodiment 1)

A timing chart of FIG. 4 shows one example of a specific start pattern of the start mode 1. In this case, when the car is started (IGN ON), the controller 32 first starts the compressor 2, and raises the number of revolution NC toward the compressor target number of revolution TGNC mentioned above. In the middle, when the number of revolution NC of the compressor 2 becomes a predetermined number of revolution Nec1 or more, the controller 32 starts the indoor blower 27, and raises the blower voltage BLV to execute control so that the air volume of the indoor blower becomes the predetermined low value Qblw1.

On the other hand, the controller 32 starts the heating medium circulating circuit 61 simultaneously with the start of the indoor blower 27 or immediately after the start of the indoor blower. The start of the heating medium circulating circuit 61 in this case means energization start to the heating medium heating electric heater 63 and the circulating pump 62. Consequently, the heating medium heated by the heating medium heating electric heater 63 is circulated through the heating medium-air heat exchanger 64, and hence the temperature of the heating medium-air heat exchanger 64 rises. Further, in a case where the temperature of the heating medium-air heat exchanger 64 becomes higher than a predetermined value Thtr1, the controller 32 takes predetermined time t1 to increase the blower voltage BLV of the indoor blower 27 so that the air volume of the indoor blower 27 reaches a target blower voltage TGBLV defined as a target value.

Consequently, in the case of the first low outdoor air temperature environment in which the outdoor air temperature Tam is low, the controller starts the compressor 2 prior to the indoor blower 27 and starts the heating medium circulating circuit 61 simultaneously with the indoor blower 27 or immediately after the start of the indoor blower, whereby under the environment in which the outdoor air temperature Tam is remarkably low, rise of the high pressure side pressure of the refrigerant circuit R can be promoted, and it is possible to rapidly start up the heating capability. Particularly in the start mode 1 of this case, after starting the compressor 2, the controller starts the indoor blower 27 when the number of revolution NC of the compressor 2 becomes the predetermined number of revolution Nec1 or more, and controls the air volume of the indoor blower 27 into the predetermined low value Qblw1, and in a case where the temperature of the heating medium-air heat exchanger 64 of the heating medium circulating circuit 61 becomes higher than the predetermined value Thtr1, the controller increases the air volume of the indoor blower 27 to the target value. Consequently, the rise of the high pressure side pressure of the refrigerant circuit R can be promoted, a temperature rise of the heating medium-air heat exchanger 64 of the heating medium circulating circuit 61 can be promoted to rapidly start up the heating capabilities of the radiator 4 and the heating medium circulating circuit 61, and comfortable heating of the vehicle interior can be achieved.

(8-3) Start Mode 2 (Embodiment 1)

Figure 5:
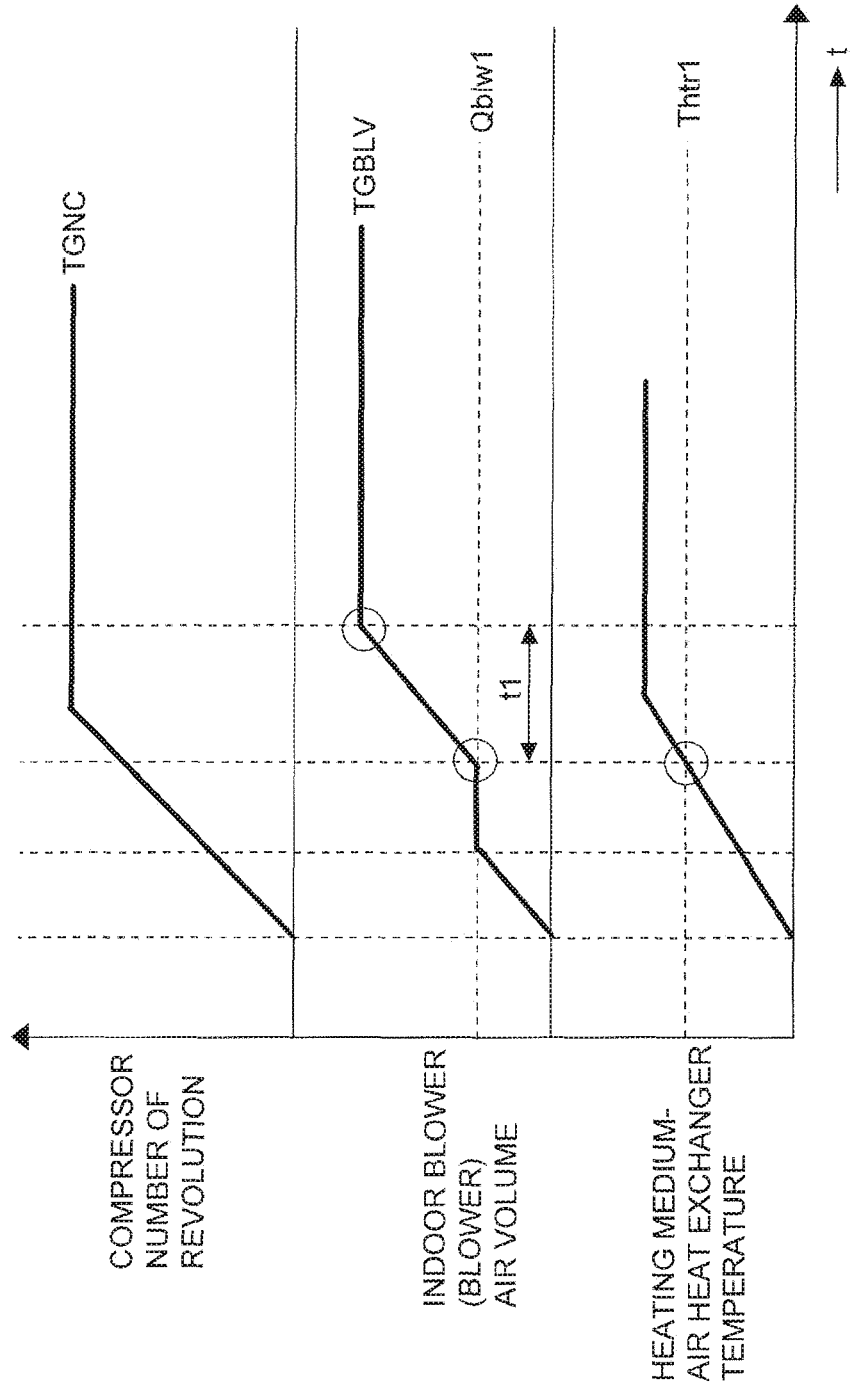
FIG. 5 is another timing chart to explain the control of the compressor, the indoor blower and the heating medium circulating circuit by the controller of FIG. 2 (Embodiment 1)

Next, a timing chart of FIG. 5 shows one example of a specific start pattern of the start mode 2. In this case, when the car is started (IGN ON), the controller 32 first starts the compressor 2, and raises the number of revolution NC toward the compressor target number of revolution TGNC mentioned above. The controller 32 starts the indoor blower 27 simultaneously with the start of the compressor 2 or immediately after the start of the compressor, and raises the blower voltage BLV to execute control so that the air volume of the indoor blower becomes the predetermined low value Qblw1.

Furthermore, the controller 32 starts the heating medium circulating circuit 61 simultaneously with the start of the indoor blower 27 or immediately after the start of the indoor blower. Also in this case, the start of the heating medium circulating circuit 61 means the energization start to the heating medium heating electric heater 63 and the circulating pump 62. Consequently, the heating medium heated by the heating medium heating electric heater 63 is circulated through the heating medium-air heat exchanger 64, and hence the temperature of the heating medium-air heat exchanger 64 rises. Further, in the case where the temperature of the heating medium-air heat exchanger 64 becomes higher than the predetermined value Thtr1, the controller 32 takes the predetermined time t1 to increase the blower voltage BLV of the indoor blower 27 so that the air volume of the indoor blower 27 reaches the target blower voltage TGBLV which is the target value.

Consequently, in the case of the second low outdoor air temperature environment in which the outdoor air temperature Tam is higher than that of the first low outdoor air temperature environment, the controller starts the indoor blower 27 simultaneously with the compressor 2 or immediately after the start of the compressor, and starts the heating medium circulating circuit 61 simultaneously with the indoor blower 27 or immediately after the start of the indoor blower, whereby in a case where the outdoor air temperature Tam is higher than that of the abovementioned first low outdoor air temperature environment and the rise of the high pressure side pressure of the refrigerant circuit R is not slow as compared with the case of the first low outdoor air temperature environment, the indoor blower 27 can more quickly be started, and the startup of the heating of the vehicle interior can be accelerated. Particularly in the start mode 2 of this case, after starting the indoor blower 27, the controller controls the air volume of the indoor blower 27 into the predetermined low value Qblw1, and in a case where the temperature of the heating medium-air heat exchanger 64 of the heating medium circulating circuit 61 becomes higher than the predetermined value Thtr1, the controller increases the air volume of the indoor blower 27 up to the target value. Consequently, the rise of the high pressure side pressure of the refrigerant circuit R can be promoted, and the startup of the heating of the vehicle interior can effectively be accelerated.

(8-4) Start Mode 3 (Embodiment 1)

Figure 6:
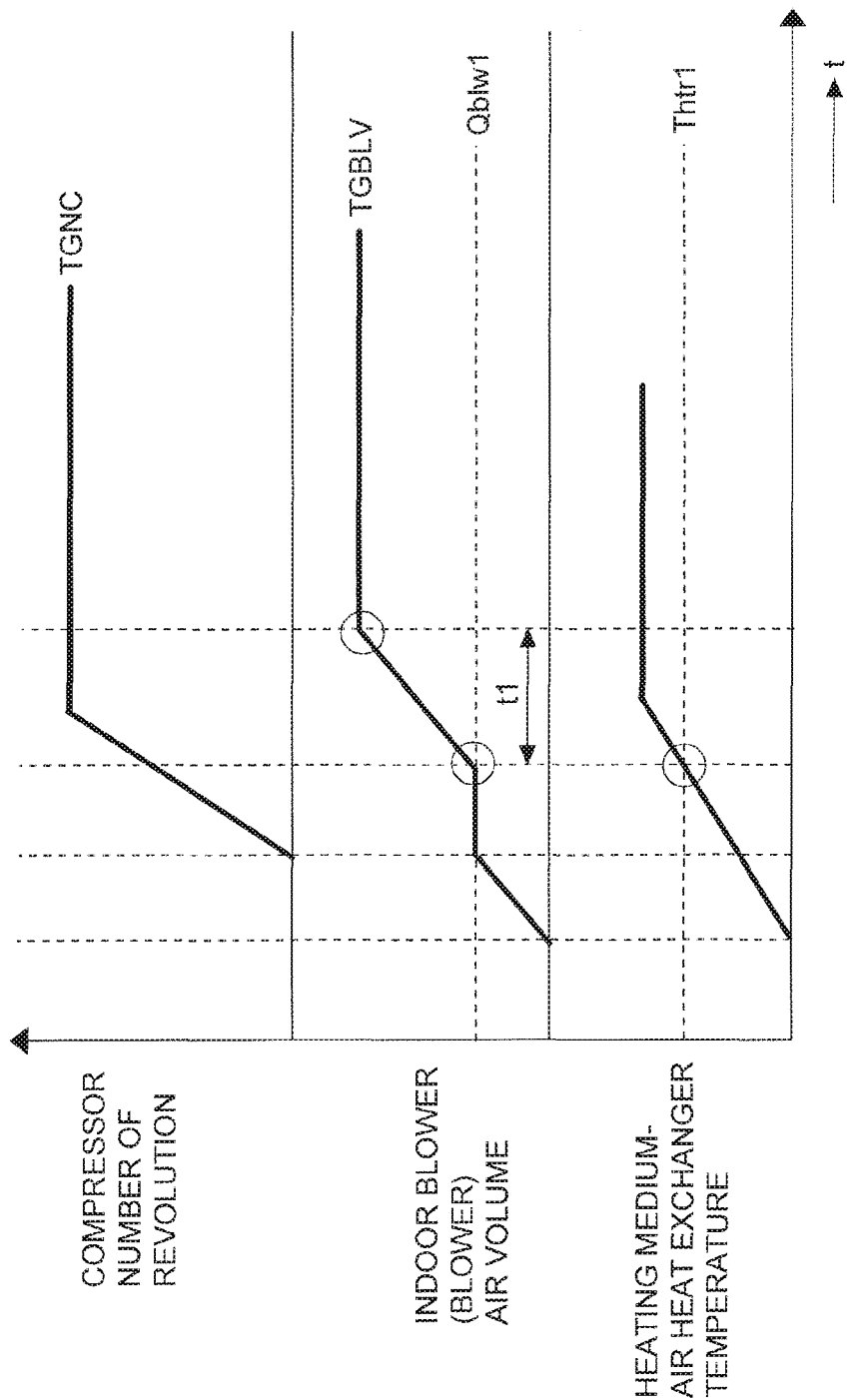
FIG. 6 is still another timing chart to explain the control of the compressor, the indoor blower and the heating medium circulating circuit by the controller of FIG. 2 (Embodiment 1)

Next, a timing chart of FIG. 6 shows one example of a specific start pattern of the start mode 3. In this case, when the car is started (IGN ON), the controller 32 first starts the indoor blower 27, and raises the blower voltage BLV to execute control so that the air volume of the indoor blower becomes the predetermined low value Qblw1. Additionally, the controller starts the heating medium circulating circuit 61 simultaneously with the start of the indoor blower 27 or immediately after the start of the indoor blower. Also in this case, the start of the heating medium circulating circuit 61 means the energization start to the heating medium heating electric heater 63 and the circulating pump 62. In consequence, the heating medium heated by the heating medium heating electric heater 63 is circulated through the heating medium-air heat exchanger 64, and hence the temperature of the heating medium-air heat exchanger 64 rises.

On the other hand, the controller 32 starts the compressor 2 when the air volume of the indoor blower 27 becomes the predetermined low value Qblw1, and raises the number of revolution NC toward the compressor target number of revolution TGNC mentioned above. Further, in the case where the temperature of the heating medium-air heat exchanger 64 becomes higher than the predetermined value Thtr1, the controller 32 takes the predetermined time t1 to increase the blower voltage BLV of the indoor blower 27 so that the air volume of the indoor blower 27 reaches the target blower voltage TGBLV which is the target value.

Consequently, in the case of the third low outdoor air temperature environment in which the outdoor air temperature Tam is further higher than that of the second low outdoor air temperature environment, the controller starts the indoor blower 27 prior to the compressor 2 and starts the heating medium circulating circuit 61 simultaneously with the indoor blower 27 or immediately after the start of the indoor blower. Consequently, under the environment in which the outdoor air temperature Tam is further higher than that of the abovementioned second low outdoor air temperature environment, the disadvantage that the high pressure side pressure of the refrigerant circuit R rises in the early stages to cause the stop of the compressor 2 or the like can be avoided in advance, and the heating of the vehicle interior can smoothly be started. Particularly in the start mode 3 of this case, after starting the indoor blower 27, the controller starts the compressor 2 when the air volume of the indoor blower 27 becomes the predetermined low value Qblw1, and the controller controls the air volume of the indoor blower 27 into the predetermined low value Qblw1 until the temperature of the heating medium-air heat exchanger 64 of the heating medium circulating circuit 61 becomes higher than the predetermined value Thtr1, and in the case where the temperature of the heating medium-air heat exchanger 64 becomes higher than the predetermined value Thtr1, the controller increases the air volume of the indoor blower 27 up to the target value. Consequently, the startup of the heating of the vehicle interior can rapidly and smoothly be performed while avoiding a disadvantage due to excessive rise of the high pressure side pressure of the refrigerant circuit R.

As described above, the controller 32 controls timing to start the compressor 2, the indoor blower 27 and the heating medium circulating circuit 61 on the basis of the outdoor air temperature Tam, whereby it is possible to start the compressor 2, the indoor blower 27 and the heating medium circulating circuit 61 at appropriate timing in accordance with the outdoor air temperature environment.

Embodiment 2

Figure 7:
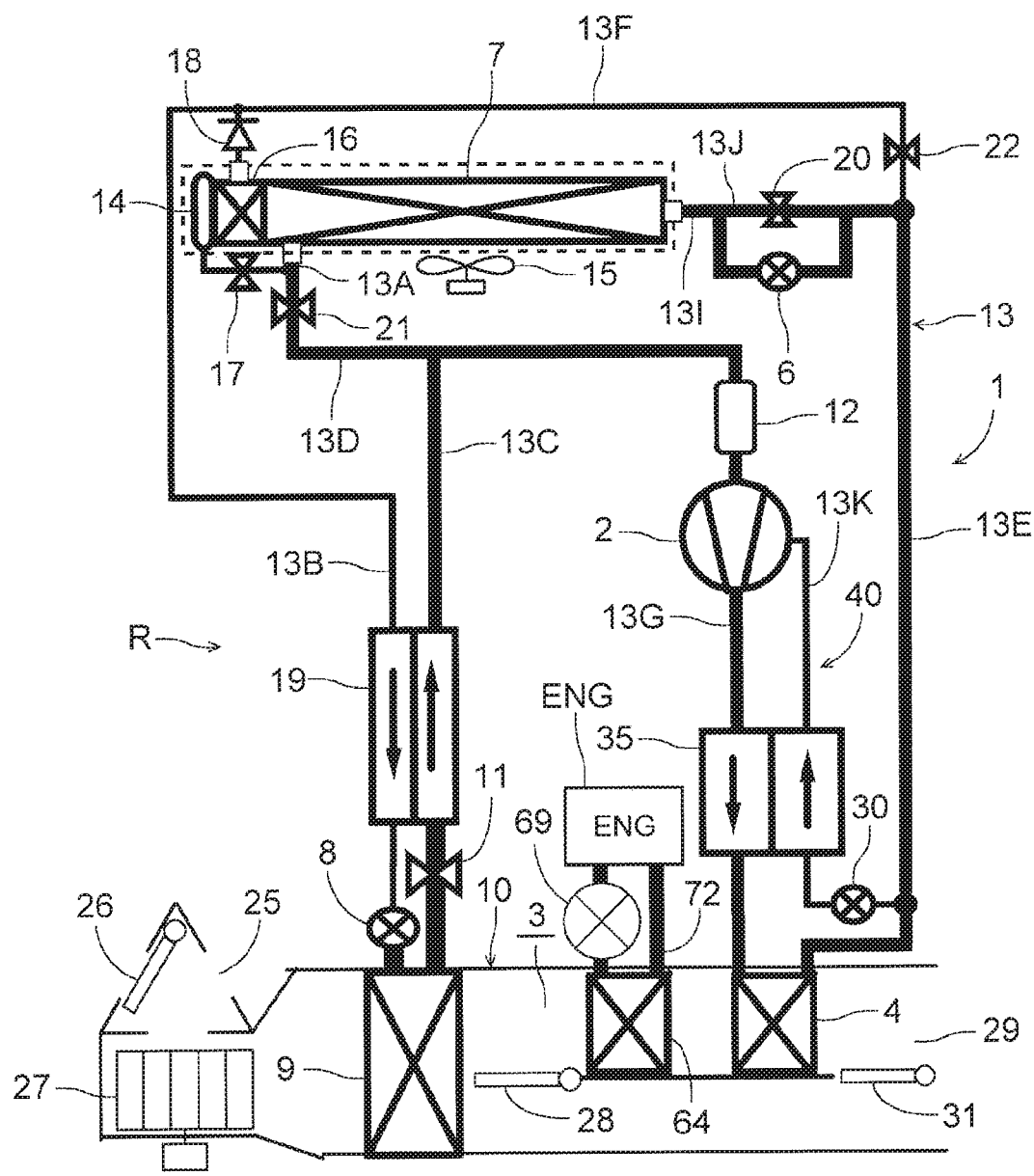
FIG. 7 is a constitutional view of a vehicle air-conditioning device of another embodiment to which the present invention is applied (Embodiment 2)

Next, another embodiment of the present invention will be described with reference to FIG. 7 to FIG. 13. FIG. 7 is a constitutional view of a vehicle air-conditioning device 1 of this case, and components denoted with the same reference numerals as in FIG. 1 perform the same or similar functions. Additionally, a car of this case has an engine ENG. In the abovementioned embodiment (Embodiment 1), heat generating means is constituted of the heating medium circulating circuit 61, but in this case, the engine ENG is present, and hence cooling water of the engine ENG is circulated as a heating medium through a heating medium-air heat exchanger 64 by a cooling water pipe 72.

Additionally, in the cooling water pipe 72, there is disposed a solenoid valve (a valve unit) which controls circulation of the cooling water (the heating medium) into the heating medium-air heat exchanger 64, and the solenoid valve is controlled by a controller 32. That is, in this case, the heating medium-air heat exchanger 64 including the engine ENG, a solenoid valve 69 for the cooling water (the heating medium) and the cooling water pipe 72 constitute the heat generating means, and the heating medium-air heat exchanger 64 becomes a heater core. Another constitution and the control flowchart of FIG. 3 are similar to those of the above embodiment, and also in this case, start modes 1 to 3 are selected to be executed. However, at the start in the step S7 of the flowchart of FIG. 3, the solenoid valve 69 is opened in this case as described later.

Next, the respective start modes in this embodiment will be described in detail with reference to FIG. 8 to FIG. 13.

(9-1) Start Mode 1 (Embodiment 2)

Figure 8:
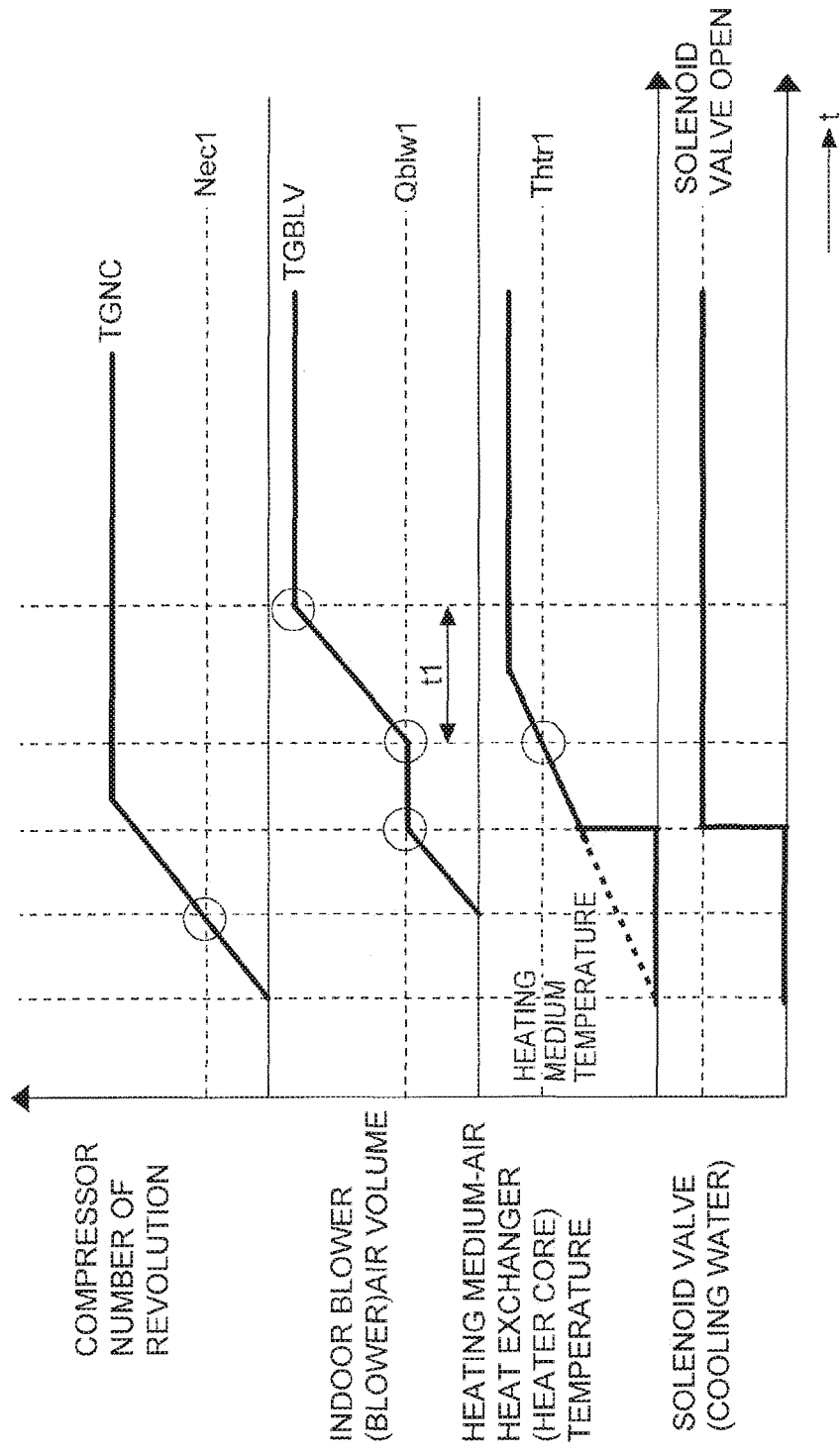
FIG. 8 is a timing chart to explain control of a compressor, an indoor blower and a solenoid valve for cooling water by the controller of FIG. 2 in the case of FIG. 7 (Embodiment 2)

A timing chart of FIG. 8 shows a specific start pattern of the start mode 1 in this embodiment. When the car is started (IGN ON), a controller 32 first starts a compressor 2, and raises a number of revolution NC toward the compressor target number of revolution TGNC mentioned above. In the middle, when the number of revolution NC of the compressor 2 become a predetermined number of revolution Nec1 or more, the controller 32 starts an indoor blower 27, and raises a blower voltage BLV to execute control so that an air volume of the indoor blower becomes a predetermined low value Qblw1.

On the other hand, at the start (IGN ON) of the car, a temperature of the heating medium that is the cooling water of the engine ENG also rises (shown by a broken line in FIG. 8), but the controller 32 closes the solenoid valve 69 in the beginning, and hence the heating medium (the cooling water) is not circulated through the heating medium-air heat exchanger 64, and the temperature of the heating medium does not change. Further, after the start of the indoor blower 27, the controller 32 opens the solenoid valve 69 when the air volume of the indoor blower becomes the predetermined low value Qblw1, and starts circulating the heating medium (the cooling water), whose temperature has risen, through the heating medium-air heat exchanger 64. This is the start of the heat generating means of this case in the step S7 of FIG. 3. The heating medium (the cooling water) whose temperature has risen in the engine ENG is circulated through the heating medium-air heat exchanger 64, and hence a temperature of the heating medium-air heat exchanger 64 rises. Further, in a case where the temperature of the heating medium-air heat exchanger 64 becomes higher than a predetermined value Thtr1, the controller 32 takes predetermined time t1 to increase the blower voltage BLV of the indoor blower 27 so that the air volume of the indoor blower 27 reaches a target blower voltage TGBLV defined as a target value.

Also in this embodiment, in a case of a first low outdoor air temperature environment in which an outdoor air temperature Tam is low, the controller starts the compressor 2 prior to the indoor blower 27 and starts the solenoid valve 69 for the heating medium (the cooling water) after the start of the indoor blower 27, whereby under the environment in which the outdoor air temperature Tam is remarkably low, rise of a high pressure side pressure of a refrigerant circuit R can be promoted, and it is possible to rapidly start up a heating capability. Particularly in the start mode 1 of this case, after starting the compressor 2, the controller starts the indoor blower 27 when the number of revolution of the compressor 2 becomes the predetermined number of revolution Nec1 or more, opens the solenoid valve 69 for the heating medium (the cooling water) when the air volume of the indoor blower 27 becomes the predetermined low value Qblw1, and controls the air volume of the indoor blower 27 into the predetermined low value Qblw1 until the temperature of the heating medium-air heat exchanger 64 becomes higher than the predetermined value Thtr1, and in a case where the temperature of the heating medium-air heat exchanger 64 becomes higher than the predetermined value Thtr1, the controller increases the air volume of the indoor blower 27 up to a target value. Therefore, the rise of the high pressure side pressure of the refrigerant circuit R can be promoted, the temperature rise of the heating medium-air heat exchanger 64 can be promoted to rapidly start up the heating capabilities of a radiator 4 and the heating medium-air heat exchanger 64, and comfortable heating of a vehicle interior can be achieved.

Particularly in the case of this embodiment, the controller opens the solenoid valve 69 (starts the heat generating means) when the temperature of the heating medium (the cooling water) into the heating medium-air heat exchanger 64 rises, and hence it is possible to eliminate the disadvantage that the heating medium (the cooling water) whose temperature is low is circulated through the heating medium-air heat exchanger 64 and that a temperature of air contrarily drops in the heating medium-air heat exchanger 64, and it is possible to effectively promote increase of the heating capability of the radiator 4 due to the rise of the high pressure side pressure of the refrigerant circuit R.

This is effective in a case where the heating medium-air heat exchanger 64 is disposed on an upstream side of the flowing air to the radiator 4 as in the embodiment, and it is possible to avoid the disadvantage that the temperature of the air flowing into the radiator 4 lowers due to the temperature drop in the heating medium-air heat exchanger 64 and that the rise of the high pressure side pressure of the refrigerant circuit R is obstructed.

(9-2) Start Mode 2 (Embodiment 2)

Figure 9:
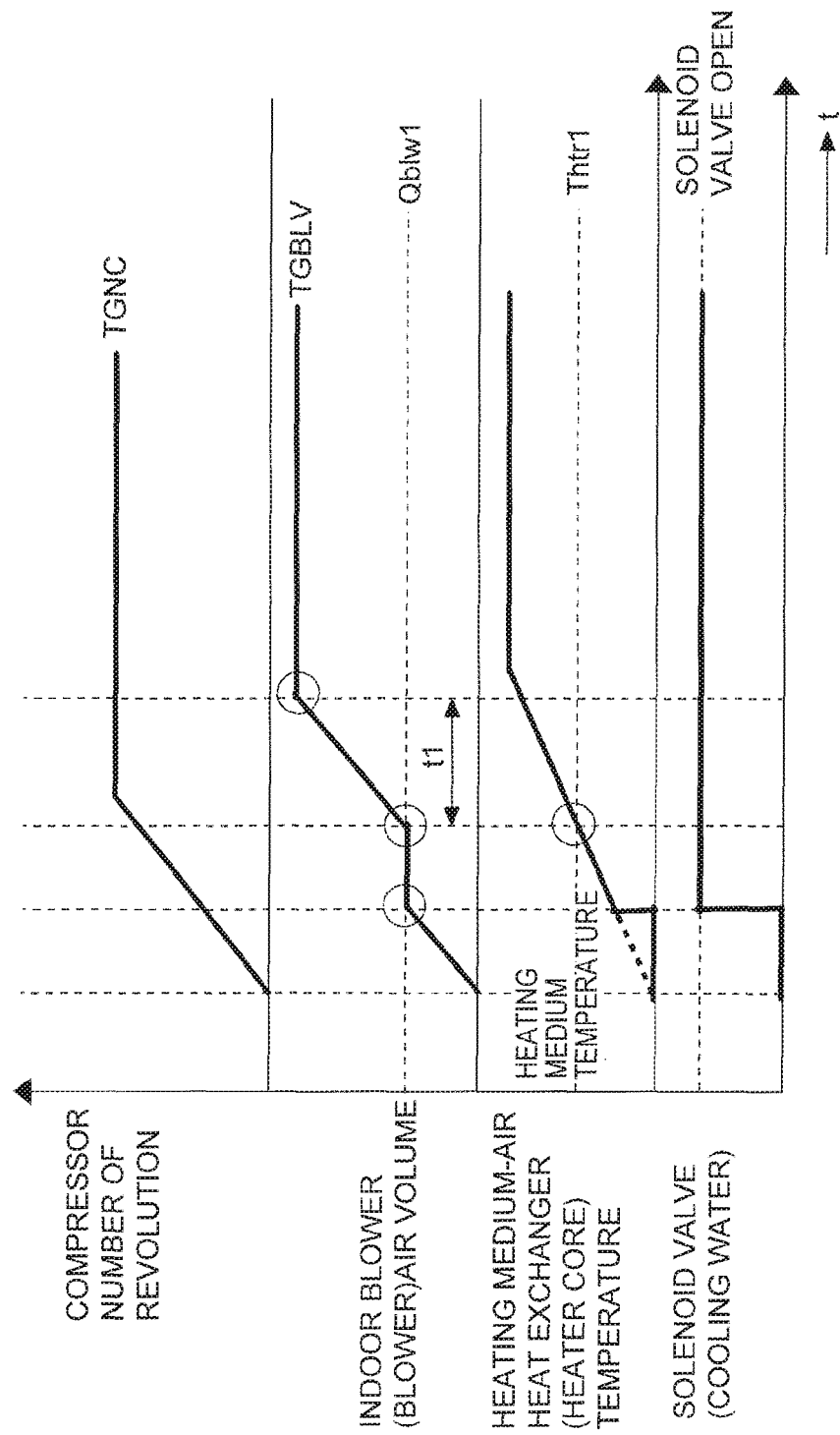
FIG. 9 is another timing chart to explain the control of the compressor, the indoor blower and the solenoid valve for cooling water by the controller of FIG. 2 in the case of FIG. 7 (Embodiment 2)

Next, a timing chart of FIG. 9 shows a specific start pattern of the start mode 2 of this embodiment. In this case, when the car is started (IGN ON), the controller 32 first starts the compressor 2, and raises the number of revolution NC toward the compressor target number of revolution TGNC mentioned above. The controller 32 starts the indoor blower 27 simultaneously with the start of the compressor 2 or immediately after the start of the compressor, and raises the blower voltage BLV to execute control so that the air volume of the indoor blower becomes the predetermined low value Qblw1.

On the other hand, at the start (IGN ON) of the car, the temperature of the heating medium that is the cooling water of the engine ENG also rises (shown by a broken line in FIG. 9), but the controller 32 closes the solenoid valve 69 in the beginning, and hence the heating medium (the cooling water) is not circulated through the heating medium-air heat exchanger 64, and the temperature of the heating medium does not change. Further, after the start of the indoor blower 27, the controller 32 opens the solenoid valve 69 when the air volume of the indoor blower becomes the predetermined low value Qblw1, and starts circulating the heating medium (the cooling water), whose temperature has risen, through the heating medium-air heat exchanger 64. This is the start of the heat generating means. The heating medium (the cooling water) whose temperature has risen in the engine ENG is circulated through the heating medium-air heat exchanger 64, and hence the temperature of the heating medium-air heat exchanger 64 rises. Further, in the case where the temperature of the heating medium-air heat exchanger 64 becomes higher than the predetermined value Thtr1, the controller 32 takes the predetermined time t1 to increase the blower voltage BLV of the indoor blower 27 so that the air volume of the indoor blower 27 reaches the target blower voltage TGBLV which is the target value.

Consequently, in a case of a second low outdoor air temperature environment in which the outdoor air temperature Tam is higher than that of the first low outdoor air temperature environment, the controller starts the indoor blower 27 simultaneously with the compressor 2 or immediately after the start of the compressor, and opens the solenoid valve 69 for the heating medium after the start of the indoor blower 27, whereby in a case where the outdoor air temperature Tam is higher than that of the abovementioned first low outdoor air temperature environment and the rise of the high pressure side pressure of the refrigerant circuit R is not slow as compared with the case of the first low outdoor air temperature environment, the indoor blower 27 can more quickly be started, and the startup of the heating of the vehicle interior can be accelerated. Particularly in the start mode 2 of this case, after starting the indoor blower 27, the controller opens the solenoid valve 69 for the heating medium (starts the heat generating means) when the air volume of the indoor blower 27 becomes the predetermined low value Qblw1, and controls the air volume of the indoor blower 27 into the predetermined low value Qblw1 until the temperature of the heating medium-air heat exchanger 64 becomes higher than the predetermined value Thtr1, and in a case where the temperature of the heating medium-air heat exchanger 64 becomes higher than the predetermined value Thtr1, the controller increases the air volume of the indoor blower 27 up to the target value. Therefore, the rise of the high pressure side pressure of the refrigerant circuit R can be promoted, and the startup of the heating of the vehicle interior can effectively be accelerated.

(9-3) Start Mode 3 (Embodiment 2)

Figure 10:
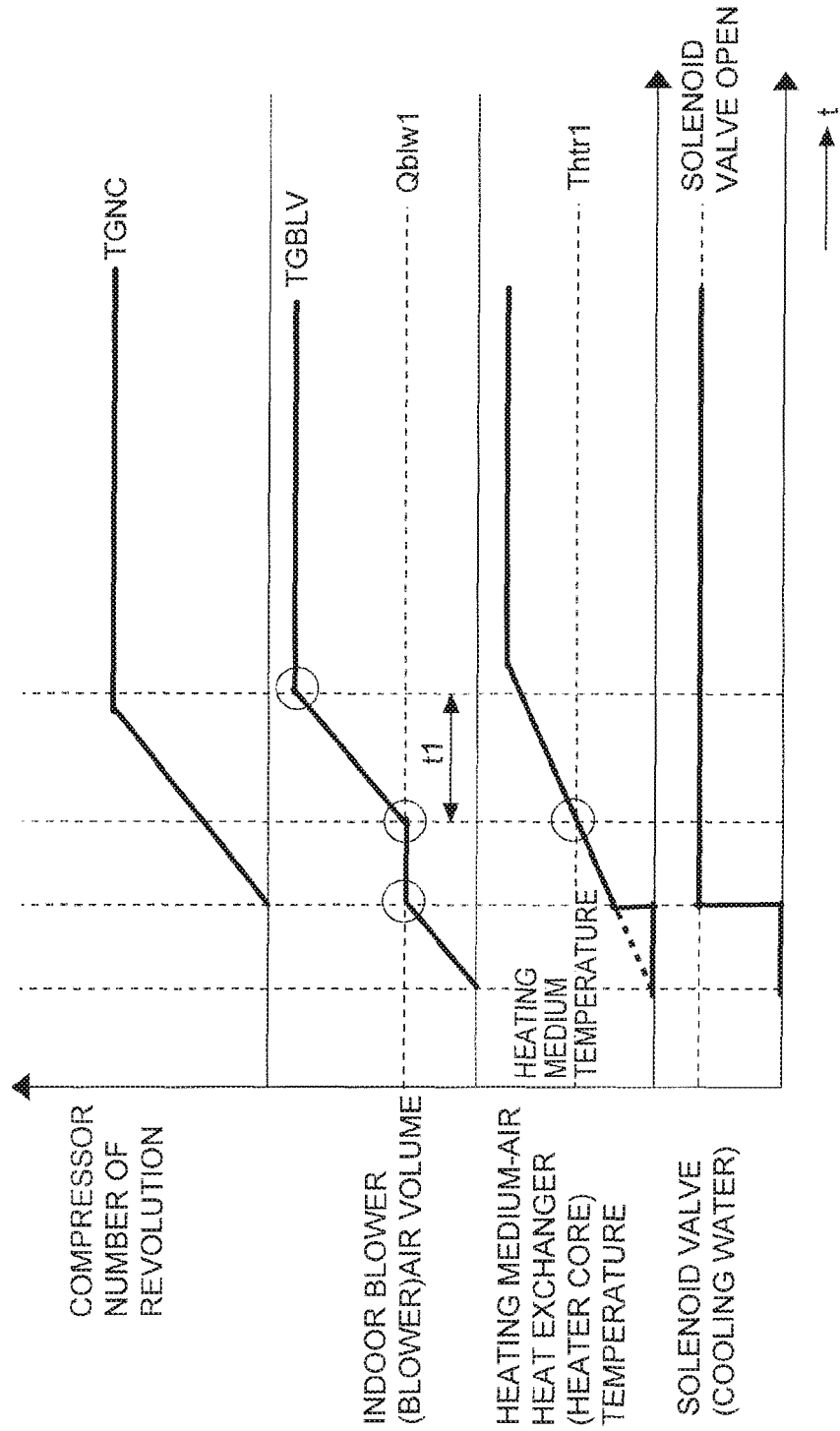
FIG. 10 is still another timing chart to explain the control of the compressor, the indoor blower and the solenoid valve for cooling water by the controller of FIG. 2 in the case of FIG. 7 (Embodiment 2)

Next, a timing chart of FIG. 10 shows a specific start pattern of the start mode 3 of this embodiment. In the case of this embodiment, when the car is started (IGN ON), the controller 32 first starts the indoor blower 27, and raises the blower voltage BLV to execute control so that the air volume of the indoor blower becomes the predetermined low value Qblw1. On the other hand, at the start (IGN ON) of the car, the temperature of the heating medium that is the cooling water of the engine ENG also rises (shown by a broken line in FIG. 10), but the controller 32 closes the solenoid valve 69 in the beginning, and hence the heating medium (the cooling water) is not circulated through the heating medium-air heat exchanger 64, and the temperature of the heating medium does not change. Further, after the start of the indoor blower 27, the controller 32 opens the solenoid valve 69 when the air volume of the indoor blower becomes the predetermined low value Qblw1, and starts circulating the heating medium (the cooling water), whose temperature has risen, through the heating medium-air heat exchanger 64. This is the start of the heat generating means. The heating medium (the cooling water) whose temperature has risen in the engine ENG is circulated through the heating medium-air heat exchanger 64, and hence the temperature of the heating medium-air heat exchanger 64 rises.

On the other hand, simultaneously when or immediately after opening the solenoid valve 69, the controller 32 starts the compressor 2, and raises the number of revolution NC toward the compressor target number of revolution TGNC mentioned above. Further, in the case where the temperature of the heating medium-air heat exchanger 64 becomes higher than the predetermined value Thtr1, the controller 32 takes the predetermined time t1 to increase the blower voltage BLV of the indoor blower 27 so that the air volume of the indoor blower 27 reaches the target blower voltage TGBLV which is the target value.

Consequently, in a case of a third low outdoor air temperature environment in which the outdoor air temperature Tam is higher than that of the second low outdoor air temperature environment, the controller starts the indoor blower 27 prior to the compressor 2 and opens the solenoid valve 69 after the start of the indoor blower 27. Consequently, under the environment in which the outdoor air temperature Tam is further higher than that of the abovementioned second low outdoor air temperature environment, the disadvantage that the high pressure side pressure of the refrigerant circuit R rises in the early stages to cause the stop of the compressor 2 or the like can be avoided in advance, and the heating of the vehicle interior can smoothly be started. Particularly in the start mode 3 of this case, after starting the indoor blower 27, the controller opens the solenoid valve 69 (starts the heat generating means) when the air volume of the indoor blower 27 becomes the predetermined low value Qblw1, starts the compressor 2 simultaneously when or immediately after opening the solenoid valve 69, and controls the air volume of the indoor blower 27 into the predetermined low value Qblw1 until the temperature of the heating medium-air heat exchanger 64 becomes higher than the predetermined value Thtr1, and in the case where the temperature of the heating medium-air heat exchanger 64 becomes higher than the predetermined value Thtr1, the controller increases the air volume of the indoor blower 27 up to the target value. Consequently, the startup of the heating of the vehicle interior can rapidly and smoothly be performed while avoiding a disadvantage due to excessive rise of the high pressure side pressure of the refrigerant circuit R.

(9-4) Another Start Mode 1 (Embodiment 2)

Figure 11:
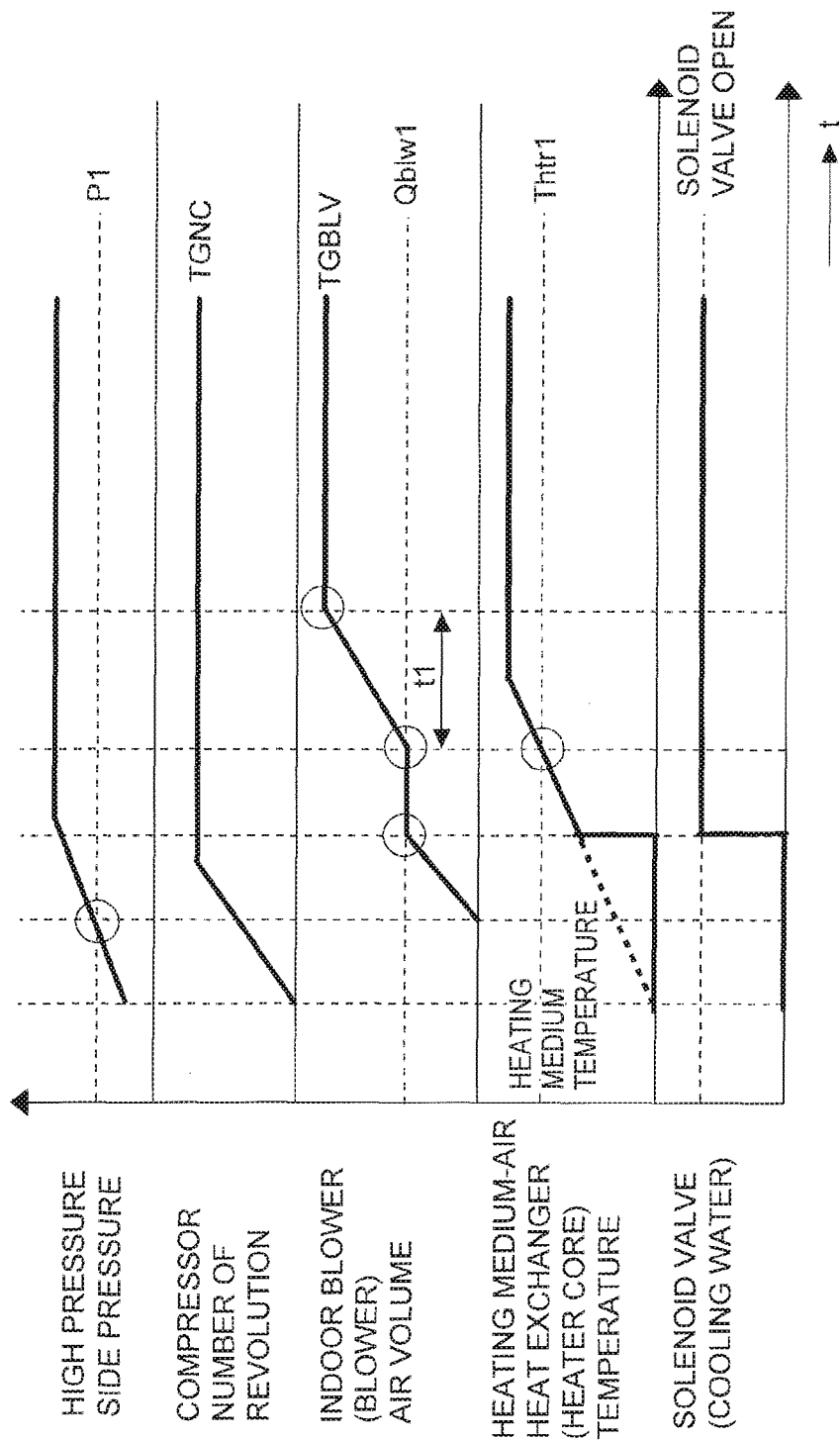
FIG. 11 is a further timing chart to explain the control of the compressor, the indoor blower and the solenoid valve for cooling water by the controller of FIG. 2 in the case of FIG. 7 (Embodiment 2)

A timing chart of FIG. 11 shows a start pattern of another start mode 1 in this embodiment. In this case, when the car is started (IGN ON), the controller 32 first starts the compressor 2, and raises the number of revolution NC toward the compressor target number of revolution TGNC mentioned above. In the middle, when the high pressure side pressure of the refrigerant circuit R (a refrigerant pressure Pci of the radiator 4 which is detected by a radiator pressure sensor 47 in the embodiment) becomes a predetermined pressure P1 or more, the controller 32 starts the indoor blower 27, and raises the blower voltage BLV to execute control so that the air volume of the indoor blower becomes the predetermined low value Qblw1.

On the other hand, at the start (IGN ON) of the car, the temperature of the heating medium that is the cooling water of the engine ENG also rises (shown by a broken line in FIG. 11), but the controller 32 closes the solenoid valve 69 in the beginning, and hence the heating medium (the cooling water) is not circulated through the heating medium-air heat exchanger 64, and the temperature of the heating medium does not change. Further, after the start of the indoor blower 27, the controller 32 opens the solenoid valve 69 when the air volume of the indoor blower becomes the predetermined low value Qblw1, and starts circulating the heating medium (the cooling water), whose temperature has risen, through the heating medium-air heat exchanger 64. This is the start of the heat generating means of this case. The heating medium (the cooling water) whose temperature has risen in the engine ENG is circulated through the heating medium-air heat exchanger 64, and hence a temperature of the heating medium-air heat exchanger 64 rises. Further, in the case where the temperature of the heating medium-air heat exchanger 64 becomes higher than the predetermined value Thtr1, the controller 32 takes the predetermined time t1 to increase the blower voltage BLV of the indoor blower 27 so that the air volume of the indoor blower 27 reaches the target blower voltage TGBLV which is the target value. Also in this case, under the environment in which the outdoor air temperature Tam is remarkably low, it is possible to promote the rise of the high pressure side pressure of the refrigerant circuit R, rapidly start up the heating capability, and achieve the comfort heating of the vehicle interior.

(9-5) Another Start Mode 2 (Embodiment 2)

Figure 12:
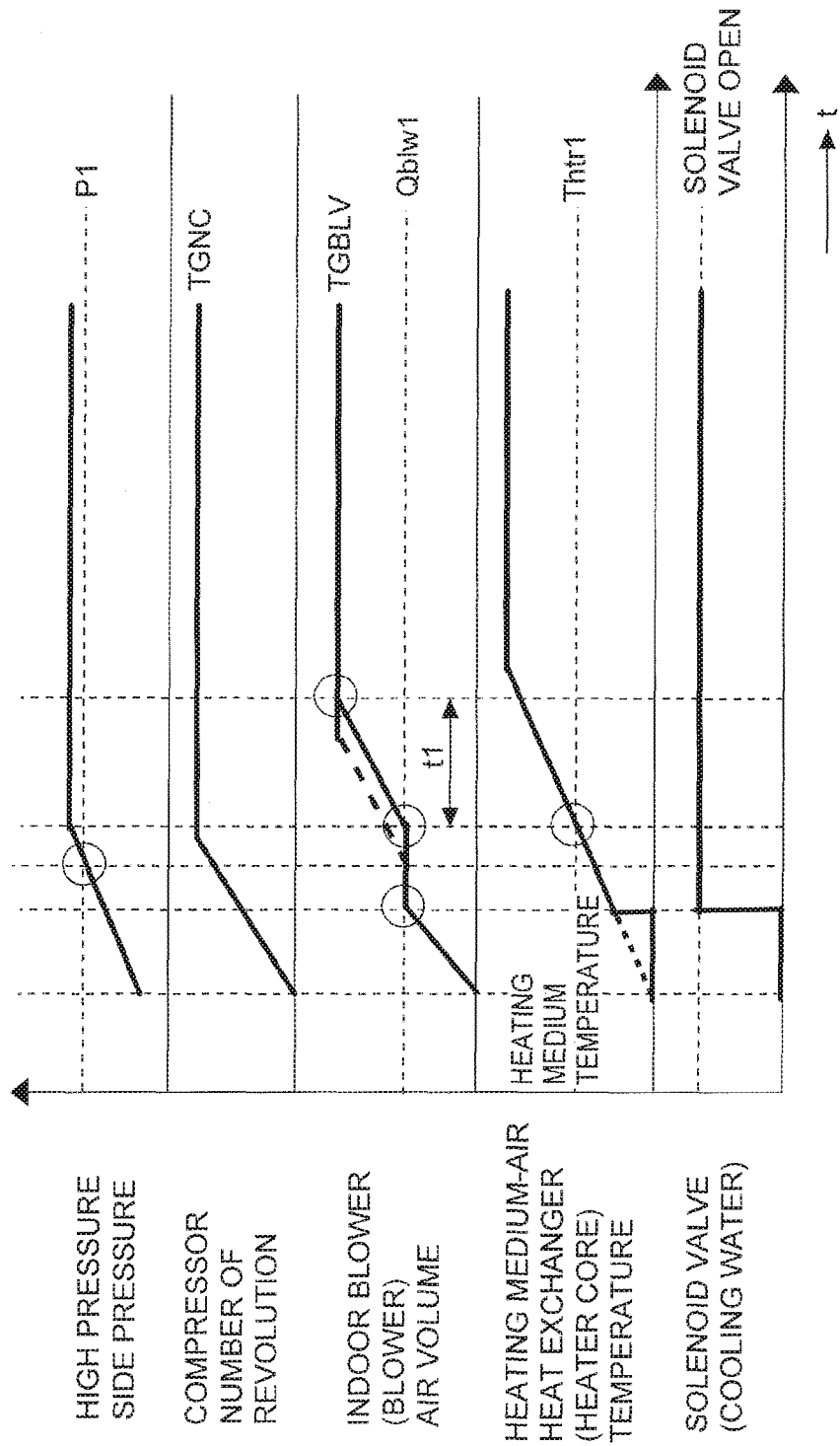
FIG. 12 is a further timing chart to explain the control of the compressor, the indoor blower and the solenoid valve for cooling water by the controller of FIG. 2 in the case of FIG. 7 (Embodiment 2)

Next, a timing chart of FIG. 12 shows a start pattern of another start mode 2 of this embodiment. In this case, when the car is started (IGN ON), the controller 32 first starts the compressor 2, and raises the number of revolution NC toward the compressor target number of revolution TGNC mentioned above. The controller 32 starts the indoor blower 27 simultaneously with or immediately after the start of the compressor 2, and raises the blower voltage BLV to execute control so that the air volume of the indoor blower becomes the predetermined low value Qblw1.

On the other hand, at the start (IGN ON) of the car, the temperature of the heating medium that is the cooling water of the engine ENG also rises (shown by a broken line in FIG. 12), but the controller 32 closes the solenoid valve 69 in the beginning, and hence the heating medium (the cooling water) is not circulated through the heating medium-air heat exchanger 64, and the temperature of the heating medium does not change. Further, after the start of the indoor blower 27, the controller 32 opens the solenoid valve 69 when the air volume of the indoor blower becomes the predetermined low value Qblw1, and starts circulating the heating medium (the cooling water), whose temperature has risen, through the heating medium-air heat exchanger 64. This is the start of the heat generating means. The heating medium (the cooling water) whose temperature has risen in the engine ENG is circulated through the heating medium-air heat exchanger 64, and hence the temperature of the heating medium-air heat exchanger 64 rises.

Further, in the case where the temperature of the heating medium-air heat exchanger 64 becomes higher than the predetermined value Thtr1 (a solid line) or in a case where the high pressure side pressure of the refrigerant circuit R becomes the predetermined pressure P1 or more (a bold broken line), the controller 32 takes the predetermined time t1 to increase the blower voltage BLV of the indoor blower 27 so that the air volume of the indoor blower 27 reaches the target blower voltage TGBLV which is the target value. Also in this case, it is possible to more quickly start the indoor blower 27, promote the rise of the high pressure side pressure of the refrigerant circuit R and effectively accelerate the startup of the heating of the vehicle interior.

(9-6) Another Start Mode 3 (Embodiment 2)

Figure 13:
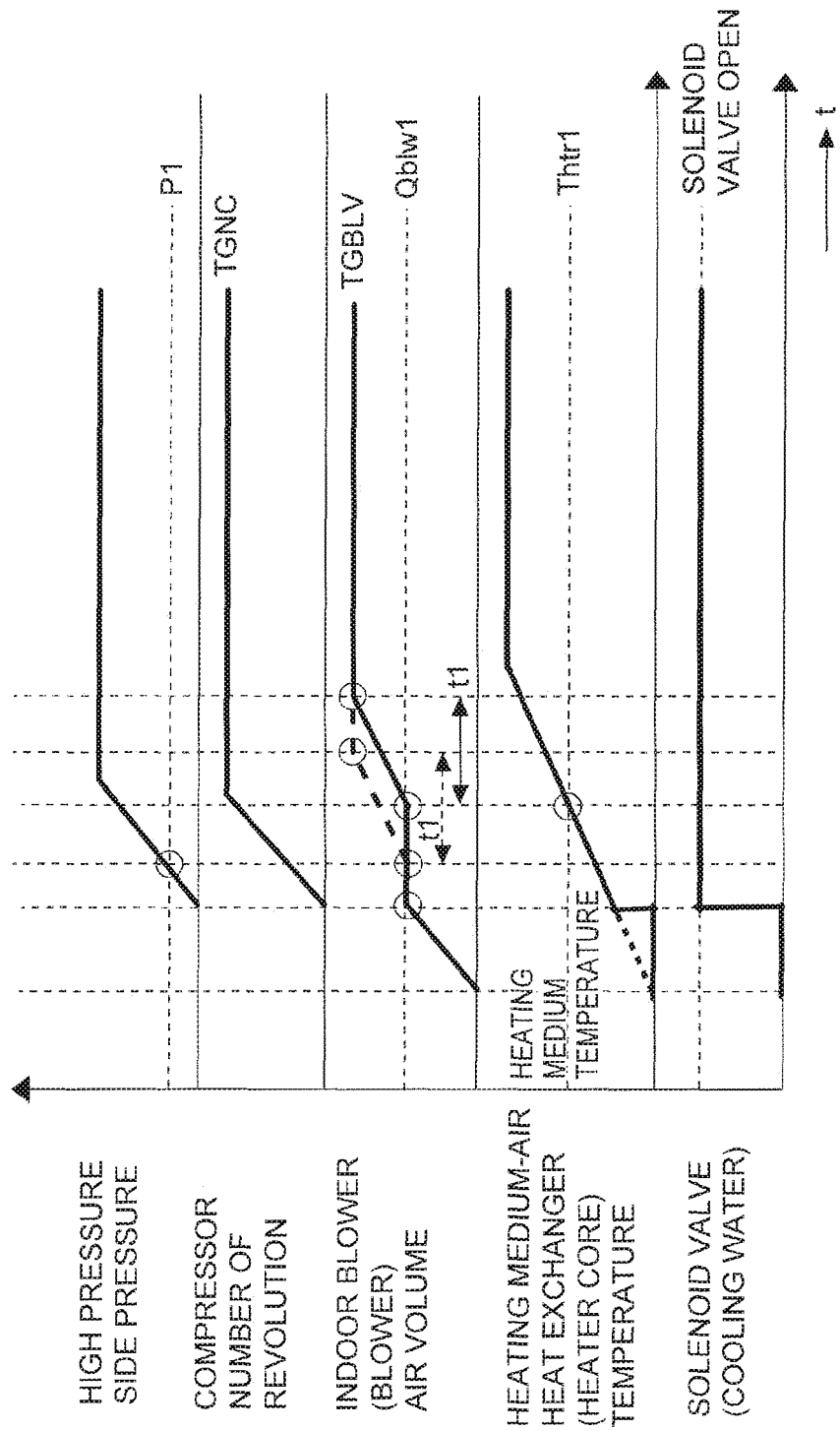
FIG. 13 is a still further timing chart to explain the control of the compressor, the indoor blower and the solenoid valve for cooling water by the controller of FIG. 2 in the case of FIG. 7 (Embodiment 2)

Next, a timing chart of FIG. 13 shows a start pattern of another start mode 3 of this embodiment. In the case of this embodiment, when the car is started (IGN ON), the controller 32 first starts the indoor blower 27, and raises the blower voltage BLV to execute control so that the air volume of the indoor blower becomes the predetermined low value Qblw1. On the other hand, at the start (IGN ON) of the car, the temperature of the heating medium that is the cooling water of the engine ENG also rises (shown by a fine broken line in FIG. 13), but the controller 32 closes the solenoid valve 69 in the beginning, and hence the heating medium (the cooling water) is not circulated through the heating medium-air heat exchanger 64, and the temperature of the heating medium does not change. Further, after the start of the indoor blower 27, the controller 32 opens the solenoid valve 69 when the air volume of the indoor blower becomes the predetermined low value Qblw1, and starts circulating the heating medium (the cooling water), whose temperature has risen, through the heating medium-air heat exchanger 64. This is the start of the heat generating means. The heating medium (the cooling water) whose temperature has risen in the engine ENG is circulated through the heating medium-air heat exchanger 64, and hence the temperature of the heating medium-air heat exchanger 64 rises.

On the other hand, simultaneously when or immediately after opening the solenoid valve 69, the controller 32 starts the compressor 2, and raises the number of revolution NC toward the compressor target number of revolution TGNC mentioned above. Further, in the case where the temperature of the heating medium-air heat exchanger 64 becomes higher than the predetermined value Thtr1 (a solid line) or in a case where the high pressure side pressure of the refrigerant circuit R becomes the predetermined pressure P1 or more (a bold broken line), the controller 32 takes the predetermined time t1 to increase the blower voltage BLV of the indoor blower 27 so that the air volume of the indoor blower 27 reaches the target blower voltage TGBLV which is the target value. Also in this case, under the third low outdoor air temperature environment in which the outdoor air temperature Tam is further higher than that of the second low outdoor air temperature environment, the disadvantage that the high pressure side pressure of the refrigerant circuit R rises in the early stages to cause the stop of the compressor 2 or the like can be avoided in advance, the heating of the vehicle interior can smoothly be started, and the startup of the heating of the vehicle interior can rapidly and smoothly be performed while avoiding a disadvantage due to excessive rise of the high pressure side pressure of the refrigerant circuit R.

Embodiment 3

Figure 14:
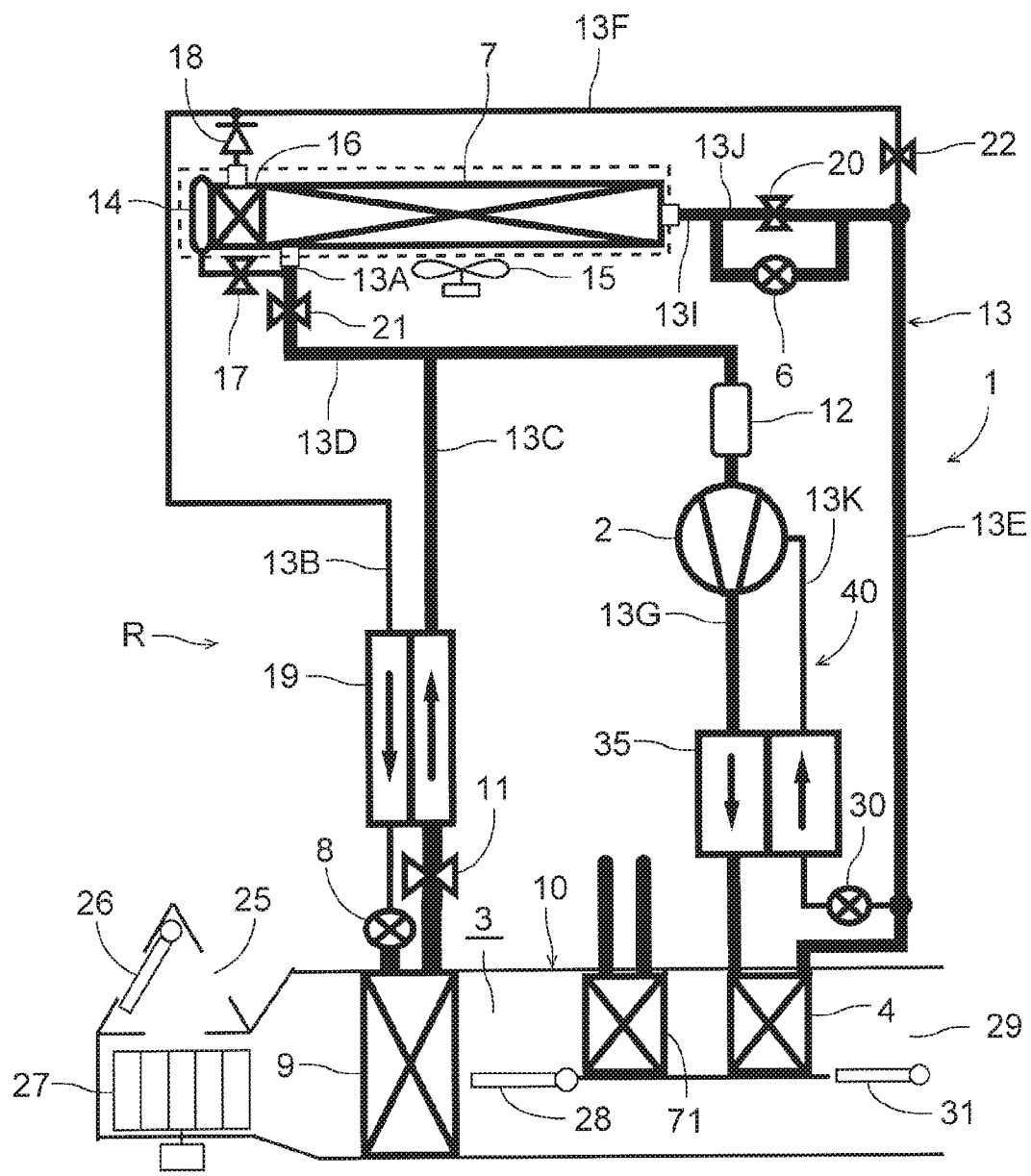
FIG. 14 is a constitutional view of a vehicle air-conditioning device of still another embodiment to which the present invention is applied (Embodiment 3)

Next, still another embodiment of the present invention will be described with reference to FIG. 14 to FIG. 17. FIG. 14 is a constitutional view of a vehicle air-conditioning device 1 of this case, and components denoted with the same reference numerals as in FIG. 1 perform the same or similar functions. In the abovementioned embodiment (Embodiment 1), heat generating means is constituted of the heating medium circulating circuit 61, but in this case, an electric heater (a PTC heater) 71 constitutes the heat generating means, and is disposed on an upstream side of flowing air in an air flow passage 3 to a radiator 4. Another constitution and the control flowchart of FIG. 3 are similar to those of the above embodiment, and also in this case, start modes 1 to 3 are selected to be executed. However, the step S7 of the flowchart of FIG. 3 is energization start of the electric heater 71 as described later in this case.

Next, the respective start modes in the case of this embodiment will be described in detail with reference to FIG. 15 to FIG. 17.

(10-1) Start Mode 1 (Embodiment 3)

Figure 15:
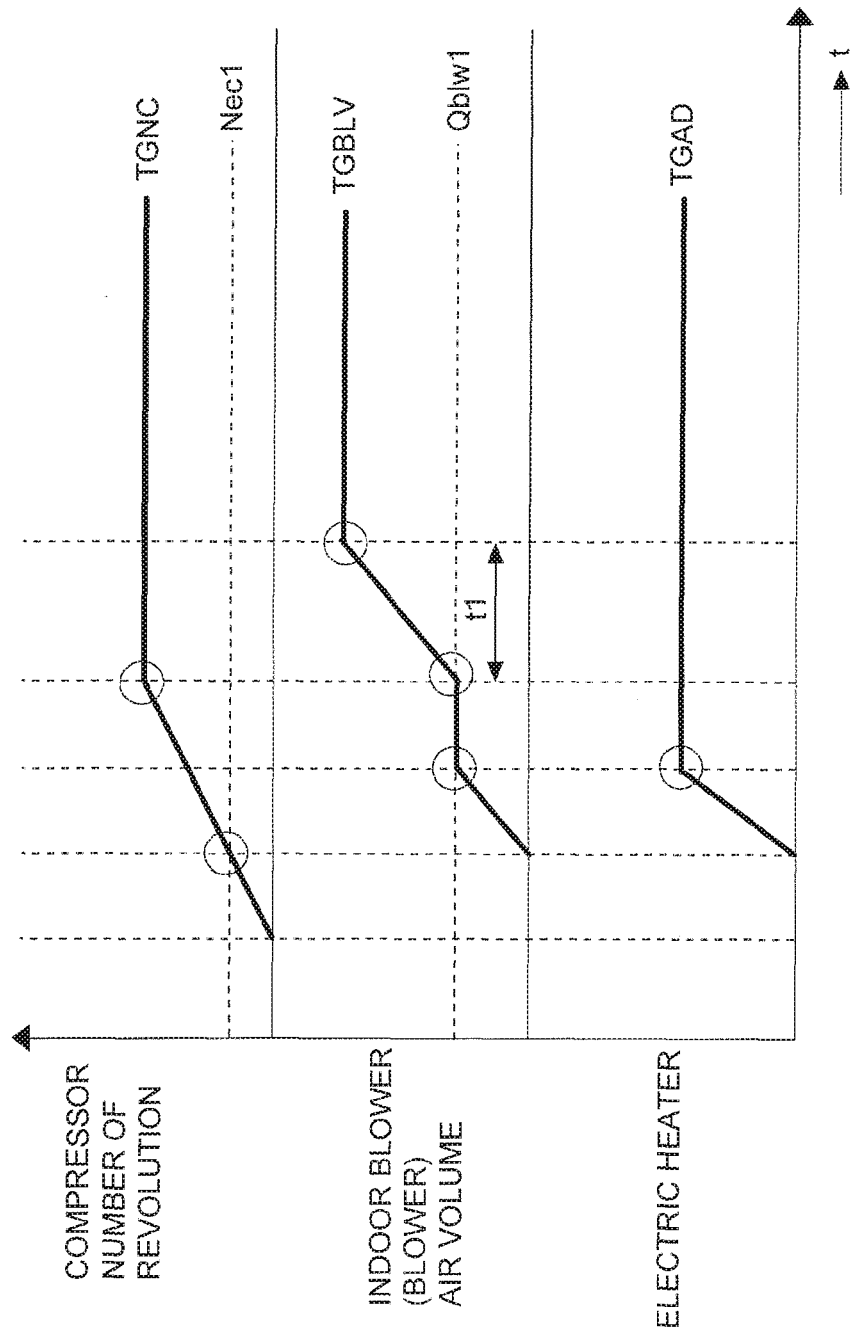
FIG. 15 is a timing chart to explain control of a compressor, an indoor blower and an electric heater by the controller of FIG. 2 in the case of FIG. 14 (Embodiment 3)

A timing chart of FIG. 15 shows a specific start pattern of the start mode 1 in this embodiment. In this case, when a car is started (IGN ON), a controller 32 first starts a compressor 2, and raises a number of revolution NC toward the compressor target number of revolution TGNC mentioned above. In the middle, when the number of revolution NC of the compressor 2 becomes a predetermined number of revolution Nec1 or more, the controller 32 starts an indoor blower 27, and raises a blower voltage BLV to execute control so that an air volume of the indoor blower becomes a predetermined low value Qblw1.

On the other hand, the controller 32 starts energization to the electric heater 71 immediately after the start of the indoor blower 27 or immediately after the start of the indoor blower (start). In consequence, a temperature of the electric heater 71 rises, and the controller 32 controls an energization ratio to finally adjust the temperature of the electric heater 71 into a predetermined target value TGAD. Additionally, in a case where the number of revolution NC of the compressor 2 reaches the compressor target number of revolution TGNC, the controller 32 takes predetermined time t1 to increase the blower voltage BLV of the indoor blower 27 so that the air volume of the indoor blower 27 reaches a target blower voltage TGBLV defined as a target value.

Consequently, in a case of a first low outdoor air temperature environment in which an outdoor air temperature Tam is low, the controller starts the compressor 2 prior to the indoor blower 27 and starts the electric heater 71 immediately after the start of the indoor blower 27 or after the start of the indoor blower, whereby under the environment in which the outdoor air temperature Tam is remarkably low, rise of a high pressure side pressure of a refrigerant circuit R can be promoted, and it is possible to rapidly start up a heating capability. Particularly in the start mode 1 of this case, after starting the compressor 2, the controller starts the indoor blower 27 when the number of revolution of the compressor 2 becomes the predetermined number of revolution Nec1 or more, and controls the air volume of the indoor blower 27 into the predetermined low value Qblw1, and in a case where the number of revolution NC of the compressor 2 becomes the target number of revolution TGNC, the controller increases the air volume of the indoor blower 27 up to a target value. Therefore, the rise of the high pressure side pressure can be promoted, the temperature rise of the electric heater 71 can be promoted to rapidly start up the heating capabilities of the radiator 4 and the electric heater 71, and comfortable heating of a vehicle interior can be achieved.

Additionally, when the heat generating means is constituted of the electric heater 71 disposed in the air flow passage 3 to heat air to be supplied to the vehicle interior as in this embodiment, a structure can be simplified.

(10-2) Start Mode 2 (Embodiment 3)

Figure 16:
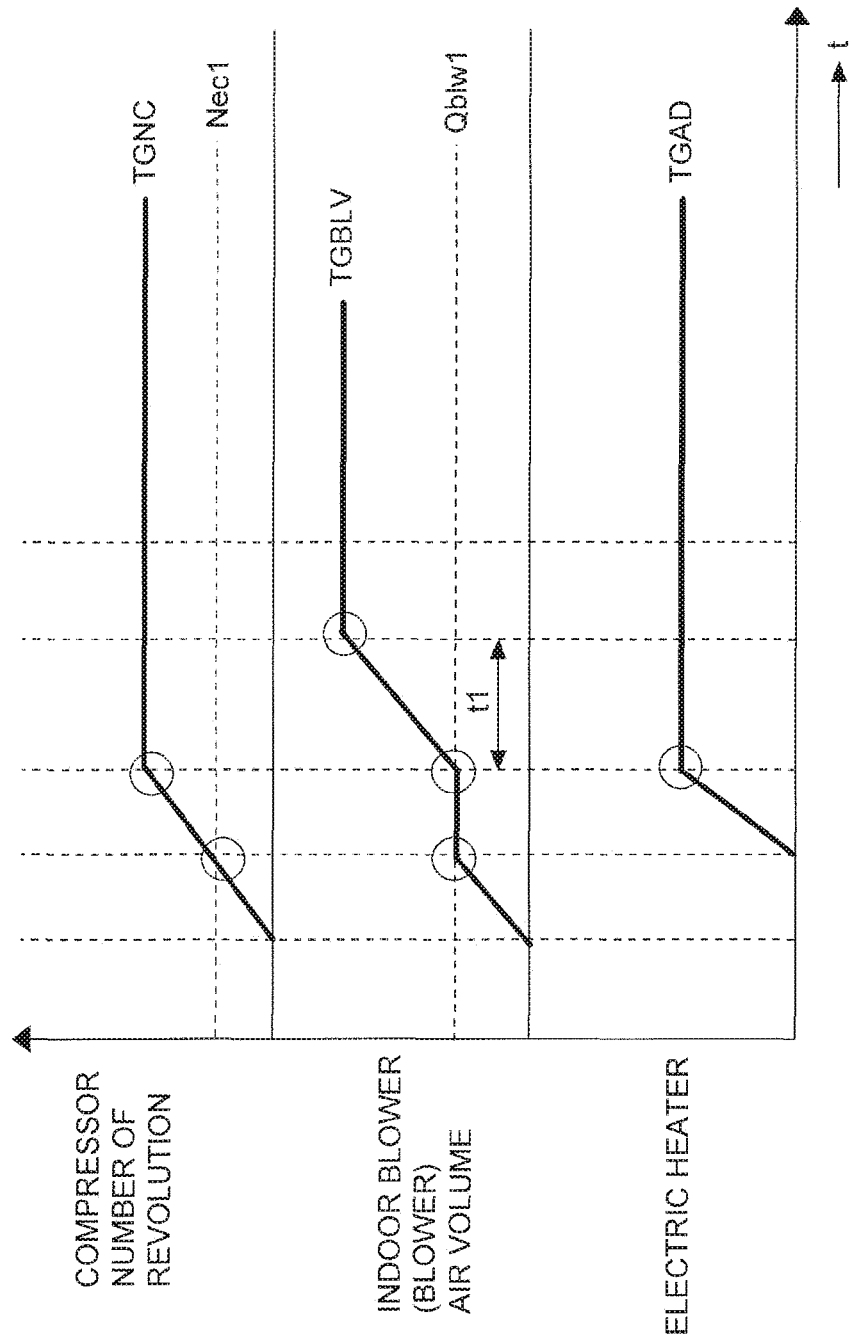
FIG. 16 is another timing chart to explain the control of the compressor, the indoor blower and the electric heater by the controller of FIG. 2 in the case of FIG. 14 (Embodiment 3)

Next, a timing chart of FIG. 16 shows a specific start pattern of the start mode 2 of this case. In this case, when the car is started (IGN ON), the controller 32 first starts the compressor 2, and raises the number of revolution NC toward the compressor target number of revolution TGNC mentioned above. The controller 32 starts the indoor blower 27 immediately after the start of the compressor 2 or after the start of the compressor, and raises the blower voltage BLV to execute control so that the air volume of the indoor blower becomes the predetermined low value Qblw1.

On the other hand, after the start of the compressor 2, the controller 32 starts energization to the electric heater 71 when the number of revolution NC of the compressor 2 becomes the predetermined number of revolution Nec1 or more (start). In consequence, the temperature of the electric heater 71 rises, and the controller 32 finally controls the temperature of the electric heater 71 into the predetermined target value TGAD. Additionally, in the case where the number of revolution NC of the compressor 2 reaches the compressor target number of revolution TGNC, the controller 32 takes the predetermined time t1 to increase the blower voltage BLV of the indoor blower 27 so that the air volume of the indoor blower 27 reaches the target blower voltage TGBLV which is the target value.

Consequently, in a case of a second low outdoor air temperature environment in which the outdoor air temperature Tam is higher than that of the first low outdoor air temperature environment, the controller starts the indoor blower 27 immediately after the start of the compressor 2 or after the start of the compressor, and starts the electric heater 71 after the start of the indoor blower 27, whereby in a case where the outdoor air temperature Tam is higher than that of the abovementioned first low outdoor air temperature environment and the rise of the high pressure side pressure of the refrigerant circuit R is not slow as compared with the case of the first low outdoor air temperature environment, the indoor blower 27 can more quickly be started, and the startup of the heating of the vehicle interior can be accelerated. Particularly in the start mode 2 of this case, after starting the indoor blower 27, the controller controls the air volume of the indoor blower 27 into the predetermined low value Qblw1, and starts the electric heater 71 when the number of revolution of the compressor 2 becomes the predetermined number of revolution Nec1 or more, and in a case where the number of revolution NC of the compressor 2 becomes the target number of revolution TGNC, the controller increases the air volume of the indoor blower 27 up to the target value. Therefore, the rise of the high pressure side pressure can be promoted, and the startup of the heating of the vehicle interior can effectively be accelerated.

(10-3) Start Mode 3 (Embodiment 3)

Figure 17:
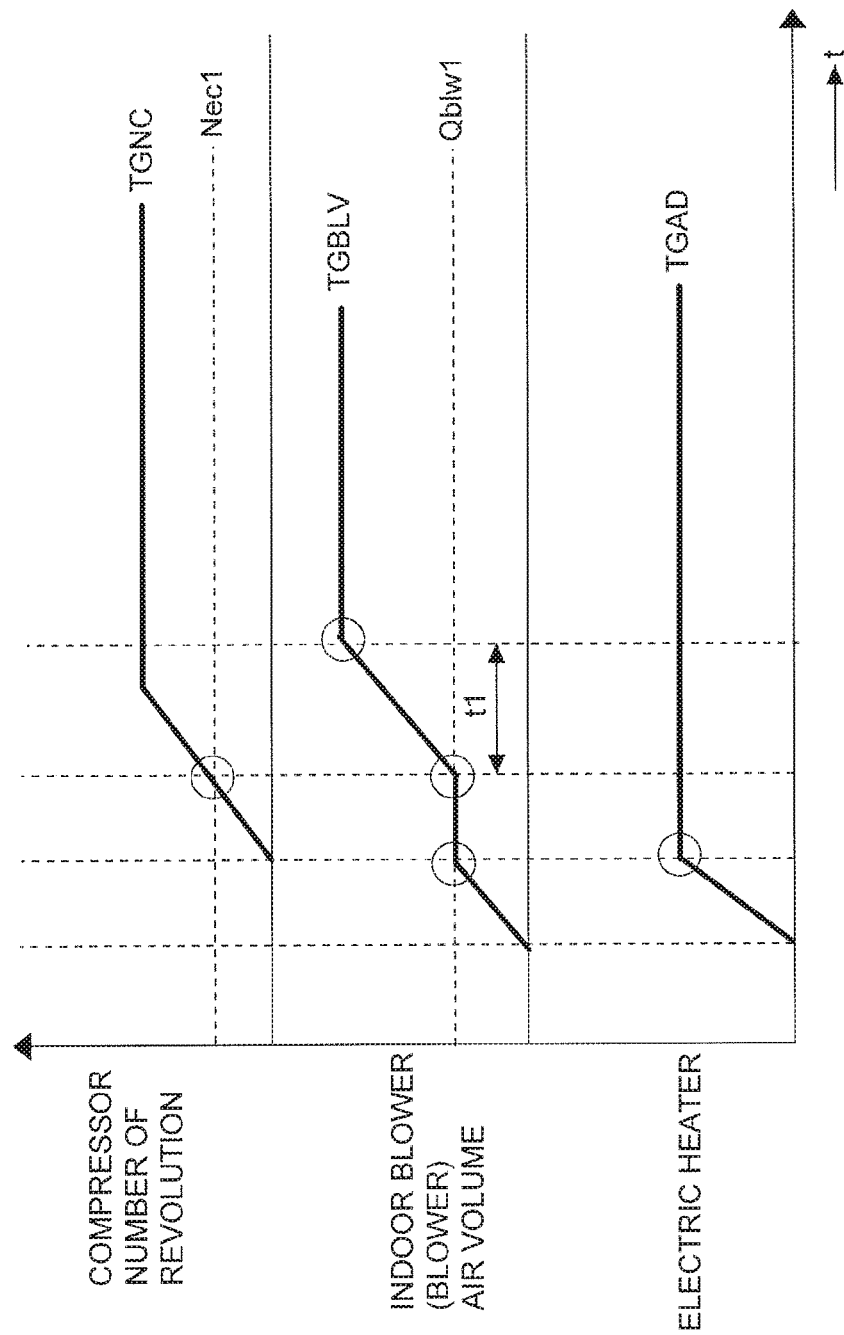
FIG. 17 is still another timing chart to explain the control of the compressor, the indoor blower and the electric heater by the controller of FIG. 2 in the case of FIG. 14 (Embodiment 3)

Next, a timing chart of FIG. 17 shows a specific start pattern of the start mode 3 of this case. In this case, when the car is started (IGN ON), the controller 32 first starts the indoor blower 27, and raises the blower voltage BLV to execute control so that the air volume of the indoor blower becomes the predetermined low value Qblw1. Additionally, immediately after the start of the indoor blower 27 or after the start of the indoor blower, the controller starts the energization to the electric heater 71 (start). In consequence, the temperature of the electric heater 71 rises, and the controller 32 finally controls the temperature of the electric heater 71 into the predetermined target value TGAD.

On the other hand, the controller 32 starts the compressor 2 when the air volume of the indoor blower 27 becomes the predetermined low value Qblw1, and raises the number of revolution NC toward the compressor target number of revolution TGNC mentioned above. Further, when the number of revolution NC of the compressor 2 becomes the predetermined number of revolution Nec1 or more, the controller 32 takes the predetermined time t1 to increase the blower voltage BLV of the indoor blower 27 so that the air volume of the indoor blower 27 reaches the target blower voltage TGBLV which is the target value.

Consequently, in a case of a third low outdoor air temperature environment in which the outdoor air temperature Tam is further higher than that of the second low outdoor air temperature environment, the controller starts the indoor blower 27 prior to the compressor 2 and starts the electric heater 71 immediately after the start of the indoor blower 27 or after the start of the indoor blower, whereby under the environment in which the outdoor air temperature Tam is further higher than that of the abovementioned second low outdoor air temperature environment, the disadvantage that the high pressure side pressure of the refrigerant circuit R rises in the early stages to cause the stop of the compressor 2 or the like can be avoided in advance, and the heating of the vehicle interior can smoothly be started. Particularly in the start mode 3 of this case, after starting the indoor blower 27, the controller starts the compressor 2 when the air volume of the indoor blower 27 becomes the predetermined low value Qblw1, and controls the air volume of the indoor blower 27 into the predetermined low value Qblw1 until the number of revolution NC of the compressor 2 becomes the predetermined number of revolution Nec1 or more, and in the case where the number of revolution NC of the compressor 2 becomes the predetermined number of revolution Nec1 or more, the controller increases the air volume of the indoor blower 27 up to the target value. Consequently, the startup of the heating of the vehicle interior can rapidly and smoothly be performed while avoiding a disadvantage due to excessive rise of the high pressure side pressure.

Embodiment 4

Figure 18:
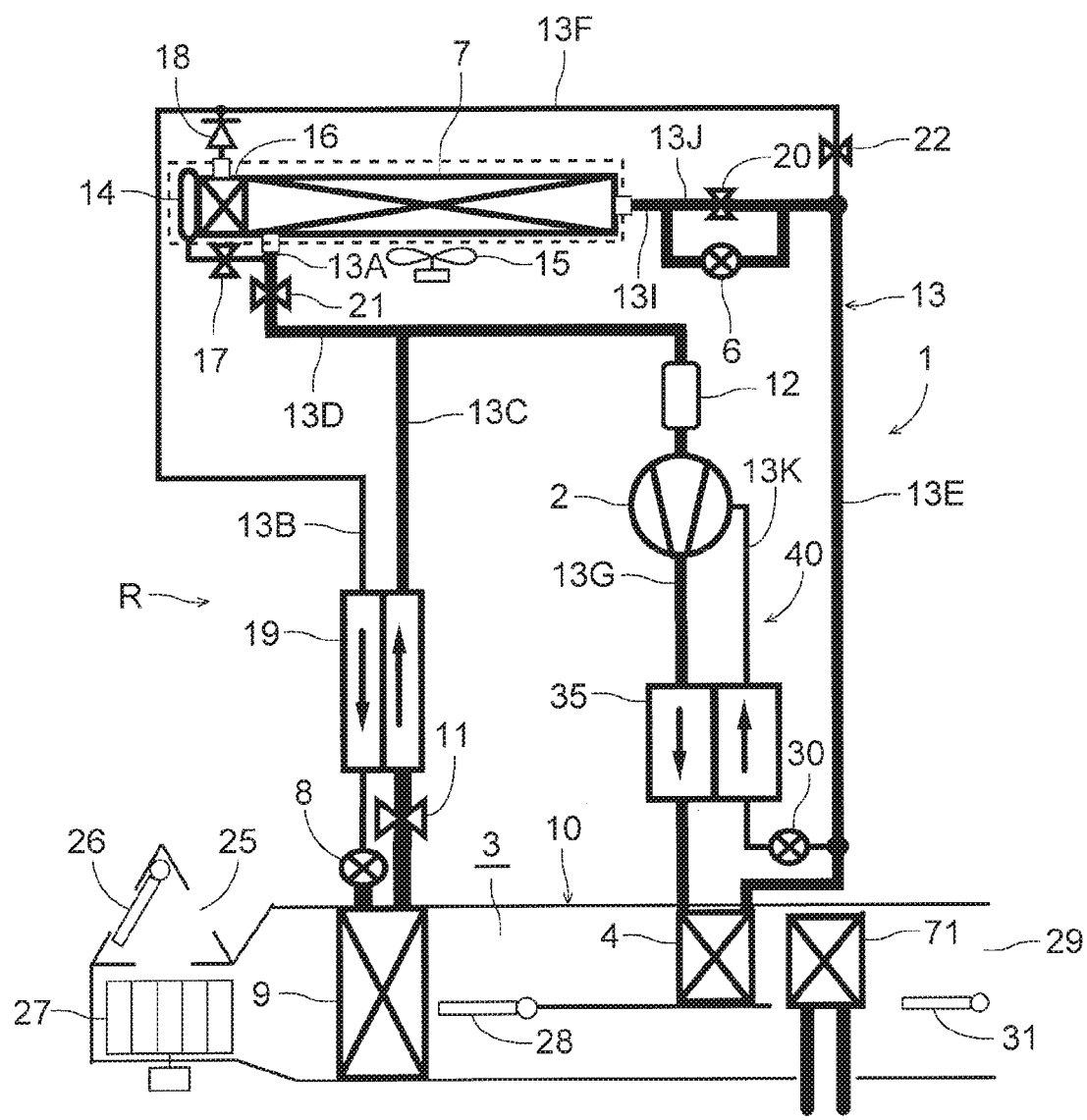
FIG. 18 is a constitutional view of a vehicle air-conditioning device of a further embodiment to which the present invention is applied (Embodiment 4)

Next, a further embodiment of the present invention will be described with reference to FIG. 18 to FIG. 21. FIG. 18 is a constitutional view of a vehicle air-conditioning device 1 of this case, and components denoted with the same reference numerals as in FIG. 14 perform the same or similar functions. In the abovementioned embodiment (Embodiment 3), the electric heater (the PTC heater) 71 as heat generating means is disposed on the upstream side of the flowing air in the air flow passage 3 to the radiator 4, but in this embodiment (Embodiment 4), an electric heater (a PTC heater) 71 is disposed on a downstream side of air flowing through an air flow passage 3 to radiator 4.

Another constitution and the control flowchart of FIG. 3 are similar to those of the above embodiment (the step S7 is energization start to the electric heater 71 in this case), and also in this case, start modes 1 to 3 are selected to be executed, but the electric heater 71 is present on the air downstream side of the radiator 4, and hence even when the electric heater 71 generates heat, the heat is not transmitted to the radiator 4 irrespective of stop/operation of an indoor blower 27. It is to be noted that the heat generating means is not limited to the electric heater (the PTC heater) 71 of the embodiment, and there may be used a structure in which there is disposed the heating medium circulating circuit 61 (Embodiment 1) or the heat generating means (Embodiment 2) using the cooling water of the engine ENG as the heating medium, and the heating medium-air heat exchanger 64 of the abovementioned embodiment is disposed on the air downstream side of the radiator 4.

Next, the respective start modes in the case of this embodiment will be described in detail with reference to FIG. 19 to FIG. 21.

(11-1) Start Mode 1 (Embodiment 4)

Figure 19:
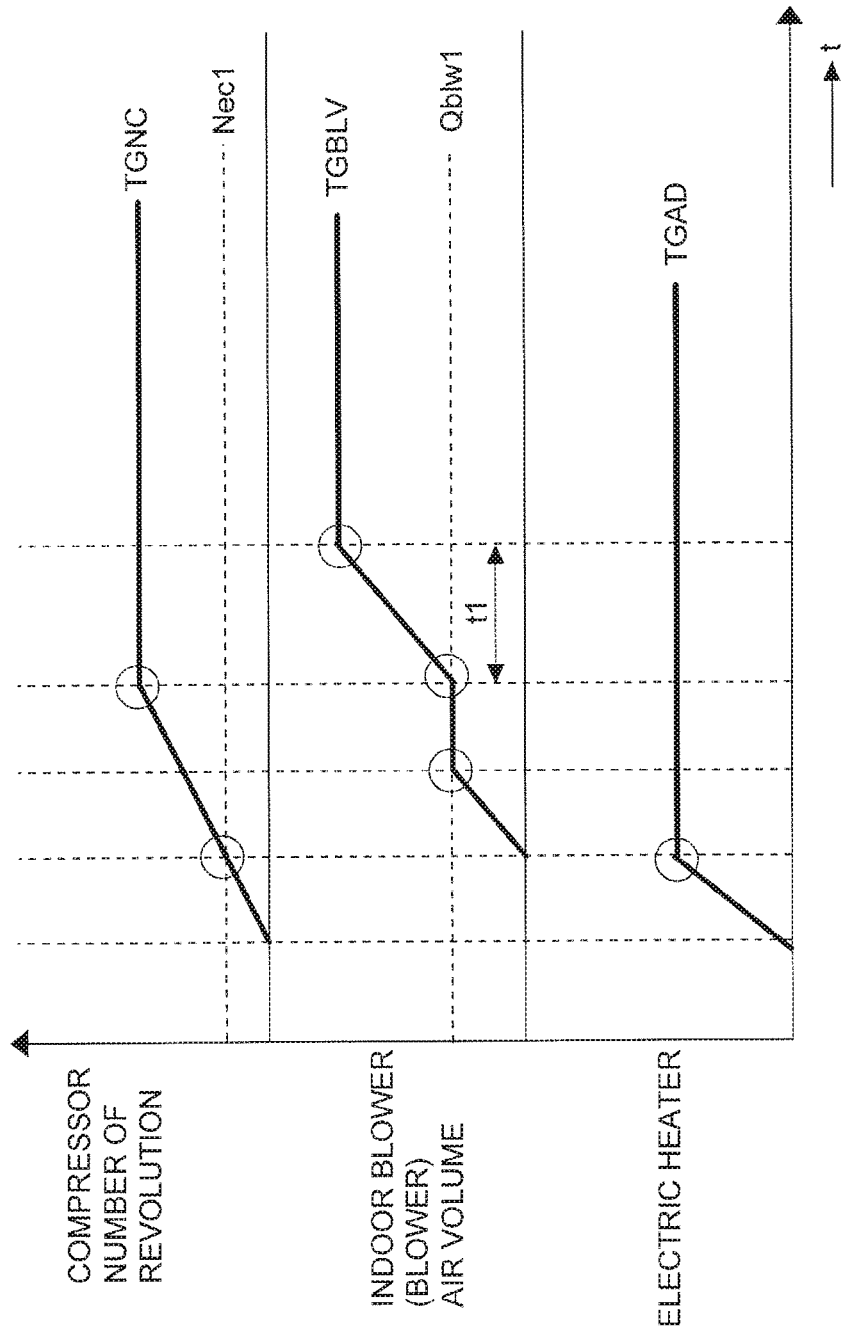
FIG. 19 is a timing chart to explain control of a compressor, an indoor blower and an electric heater by the controller of FIG. 2 in the case of FIG. 18 (Embodiment 4)

A timing chart of FIG. 19 shows a specific start pattern of the start mode 1 of this case. In this case, when a car is started (IGN ON), a controller 32 first starts a compressor 2, and raises a number of revolution NC toward the compressor target number of revolution TGNC mentioned above. Additionally, simultaneously with the start of the compressor 2, the controller 32 also starts energization to the electric heater 71 (start). In consequence, a temperature of the electric heater 71 rises, and the controller 32 finally controls the temperature of the electric heater 71 into a predetermined target value TGAD.

On the other hand, after the start of the compressor 2, the controller 32 starts the indoor blower 27 when the number of revolution NC becomes a predetermined number of revolution Nec1 or more, and raises a blower voltage BLV to execute control so that an air volume of the indoor blower becomes a predetermined low value Qblw1. Further, in a case where the number of revolution NC of the compressor 2 reaches the compressor target number of revolution TGNC, the controller takes predetermined time t1 to increase the blower voltage BLV of the indoor blower 27 so that the air volume of the indoor blower 27 reaches a target blower voltage TGBLV defined as a target value.

Consequently, when the electric heater (the heat generating means) 71 is disposed on the downstream side of the air flowing through the air flow passage 3 to the radiator 4 and even when the indoor blower 27 is started, heat generated by the electric heater 71 is not transmitted to the radiator 4, but in a case of a first low outdoor air temperature environment in which an outdoor air temperature Tam is low, the controller starts the compressor 2 and the electric heater 71 prior to the indoor blower 27, whereby under the environment in which the outdoor air temperature Tam is remarkably low, both rise of a high pressure side pressure of the compressor 2 and rise of the temperature of the electric heater 71 can be promoted, and it is possible to rapidly start up a heating capability. Particularly in the start mode 1 of this case, after starting the compressor 2, the controller starts the indoor blower 27 when the number of revolution NC of the compressor 2 becomes the predetermined number of revolution Nec1 or more, and controls the air volume of the indoor blower 27 into the predetermined low value Qblw1, and in a case where the number of revolution NC of the compressor 2 becomes the target number of revolution TGNC, the controller increases the air volume of the indoor blower 27 up to the target value. Therefore, the rise of the high pressure side pressure can be promoted, the temperature rise of the electric heater 71 can be promoted to rapidly start up the heating capabilities of the radiator 4 and the electric heater 71, and comfortable heating of a vehicle interior can be achieved.

(11-2) Start Mode 2 (Embodiment 4)

Figure 20:
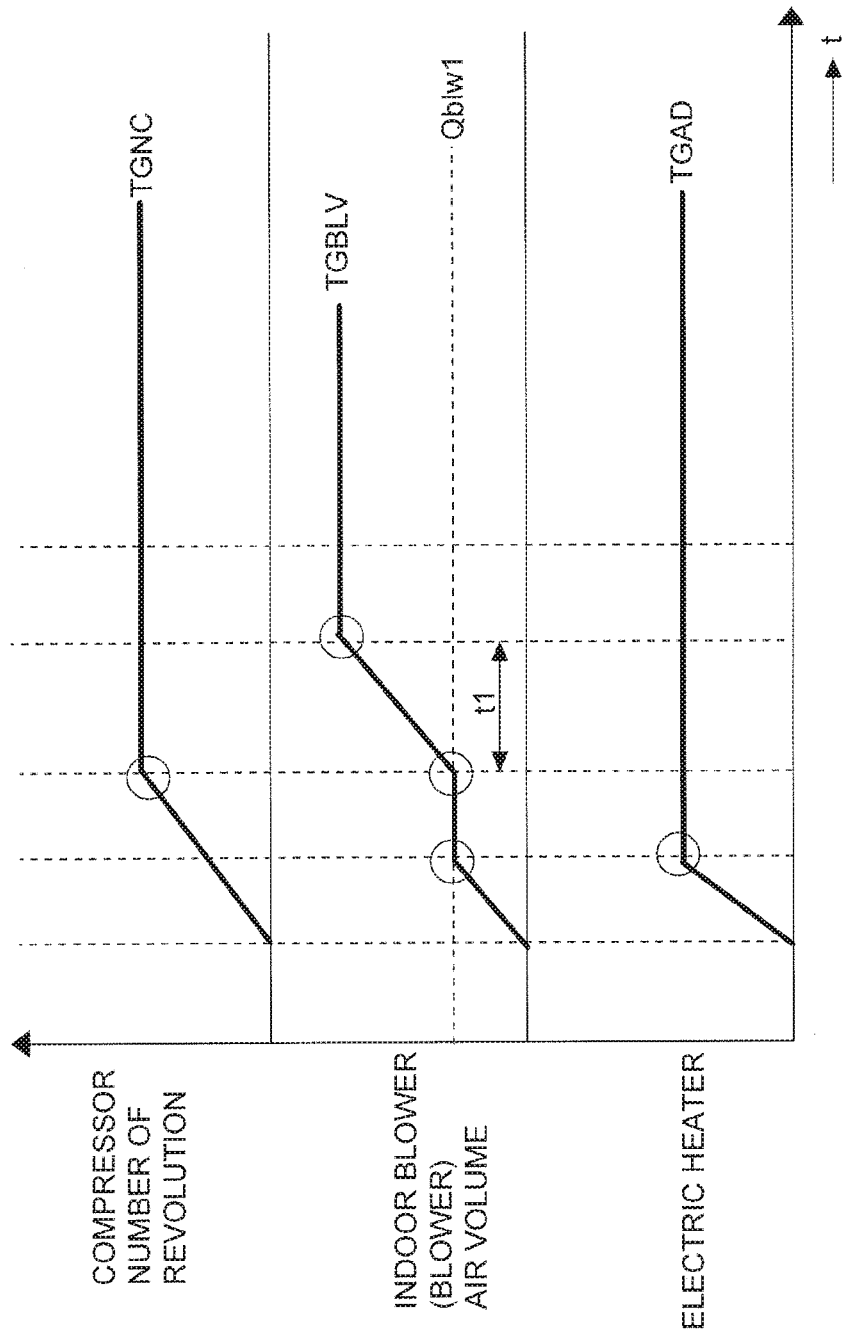
FIG. 20 is another timing chart to explain the control of the compressor, the indoor blower and the electric heater by the controller of FIG. 2 in the case of FIG. 18 (Embodiment 4)

Next, a timing chart of FIG. 20 shows a specific start pattern of the start mode 2 of this case. In this case, when the car is started (IGN ON), the controller 32 first starts the compressor 2, and raises the number of revolution NC toward the compressor target number of revolution TGNC mentioned above. The controller 32 starts the indoor blower 27 immediately after the start of the compressor 2 or after the start of the compressor, and raises the blower voltage BLV to execute control so that the air volume of the indoor blower becomes the predetermined low value Qblw1.

Additionally, the controller 32 starts the electric heater 71 simultaneously with the start of the indoor blower 27, and controls the temperature of the electric heater 71 into the predetermined target value TGAD. Further, in the case where the number of revolution NC of the compressor 2 reaches the compressor target number of revolution TGNC, the controller takes the predetermined time t1 to increase the blower voltage BLV of the indoor blower 27 so that the air volume of the indoor blower 27 reaches the target blower voltage TGBLV which is the target value.

Consequently, in a case of a second low outdoor air temperature environment in which the outdoor air temperature Tam is higher than that of the first low outdoor air temperature environment, the controller starts the indoor blower 27 and the electric heater 71 immediately after the start of the compressor 2 or after the start of the compressor, whereby in a case where the outdoor air temperature Tam is higher than that of the abovementioned first low outdoor air temperature environment and the rise of the high pressure side pressure is not slow as compared with the case of the first low outdoor air temperature environment, the indoor blower 27 can more quickly be started, and the startup of the heating of the vehicle interior can be accelerated. Particularly in the start mode 2 of this case, after starting the indoor blower 27, the controller controls the air volume of the indoor blower 27 into the predetermined low value Qblw1, and in a case where the number of revolution NC of the compressor 2 becomes the target number of revolution TGNC, the controller increases the air volume of the indoor blower 27 up to the target value. Therefore, the rise of the high pressure side pressure can be promoted, and the startup of the heating of the vehicle interior can effectively be accelerated.

(11-3) Start Mode 3 (Embodiment 4)

Next, a timing chart of FIG. 21 shows a specific start pattern of the start mode 3 of this case. In this case, when the car is started (IGN ON), the controller 32 first starts the indoor blower 27, and raises the blower voltage BLV to execute control so that the air volume of the indoor blower becomes the predetermined low value Qblw1. Additionally, immediately after the start of the indoor blower 27 or after the start of the indoor blower, the controller starts the energization to the electric heater 71 (start). In consequence, the temperature of the electric heater 71 rises, and the controller 32 finally controls the temperature of the electric heater 71 into the predetermined target value TGAD.

On the other hand, the controller 32 starts the compressor 2 when the air volume of the indoor blower 27 becomes the predetermined low value Qblw1, and raises the number of revolution NC toward the compressor target number of revolution TGNC mentioned above. Further, when the number of revolution NC of the compressor 2 becomes the predetermined number of revolution Nec1 or more, the controller 32 takes the predetermined time t1 to increase the blower voltage BLV of the indoor blower 27 so that the air volume of the indoor blower 27 reaches the target blower voltage TGBLV which is the target value.

Consequently, in a case of a third low outdoor air temperature environment in which the outdoor air temperature Tam is further higher than that of the second low outdoor air temperature environment, the controller starts the electric heater 71 and the compressor 2 immediately after the start of the indoor blower 27 or after the start of the indoor blower 27, whereby under the environment in which the outdoor air temperature Tam is further higher than that of the above-mentioned second low outdoor air temperature environment, the disadvantage that the high pressure side pressure rises in the early stages to cause the stop of the compressor 2 or the like can be avoided in advance, and the heating of the vehicle interior can smoothly be started. Particularly in the start mode 3 of this case, after starting the indoor blower 27, the controller starts the compressor 2 when the air volume of the indoor blower 27 becomes the predetermined low value Qblw1, and controls the air volume of the indoor blower 27 into the predetermined low value Qblw1 until the number of revolution NC of the compressor 2 becomes the predetermined number of revolution Nec1 or more, and in the case where the number of revolution NC of the compressor 2 becomes the predetermined number of revolution Nec1 or more, the controller increases the air volume of the indoor blower 27 up to the target value. Consequently, the startup of the heating of the vehicle interior can rapidly and smoothly be performed while avoiding a disadvantage due to excessive rise of the high pressure side pressure.

It is to be noted that in the embodiments, the present invention is applied to the vehicle air-conditioning device 1 which changes and executes the respective operation modes of the heating mode, the dehumidifying and heating mode, the dehumidifying and cooling mode and the cooling mode, but the present invention is not limited to the embodiments, and is also effective for a vehicle air-conditioning device which only performs the heating mode.

Additionally, the constitution and each numeric value of the refrigerant circuit R described in the above respective embodiments are not limited to the embodiments, and needless to say, they can be changed without departing from the gist of the present invention.

DESCRIPTION OF REFERENCE NUMERALS 1 vehicle air-conditioning device
2 compressor
3 air flow passage
4 radiator
6 outdoor expansion valve
7 outdoor heat exchanger
8 indoor expansion valve
9 heat absorber
11 evaporation capability control valve
17, 20, 21, 22 and 69 solenoid valve
26 suction changing damper
27 indoor blower (blower fan)
28 air mix damper
30 injection expansion valve
32 controller (control means)
35 discharge side heat exchanger
40 injection circuit
61 heating medium circulating circuit (heat generating means)
63 heating medium heating electric heater
64 heating medium-air heat exchanger
71 electric heater (heat generating means)
ENG engine
R refrigerant circuit

The invention claimed is:
1. A vehicle air-conditioning device comprising:
a compressor which compresses a refrigerant;
an air flow passage through which air to be supplied to a vehicle interior flows;
a radiator disposed in the air flow passage to let the refrigerant radiate heat;

a heat absorber disposed in the air flow passage to let the refrigerant absorb heat;

an indoor blower which blows air through the air flow passage; and control means comprising a controller for controlling operations of the compressor and the indoor blower, the vehicle air-conditioning device heating the air to be supplied to the vehicle interior by heat radiated from the radiator to heat the vehicle interior, the vehicle air-conditioning device comprising:

heat generating means disposed in the air flow passage to heat the air to be supplied to the vehicle interior, wherein the control means controls timing to start the compressor, the indoor blower and the heat generating means on a basis of an outdoor air temperature, wherein in a case of a first low outdoor air temperature environment in which the outdoor air temperature is low, the control means starts the compressor prior to the indoor blower, and the control means starts the heat generating means simultaneously with the indoor blower, immediately after the start of the indoor blower, or after the start of the indoor blower.

2. The vehicle air-conditioning device according to claim 1, wherein after starting the compressor, the control means starts the indoor blower when a number of revolution of the compressor becomes a predetermined number of revolution or more, and controls an air volume of the indoor blower into a predetermined low value, and in a case where a temperature of the heat generating means becomes higher than a predetermined value, the control means increases the air volume of the indoor blower up to a target value.

3. The vehicle air-conditioning device according to claim 1, wherein after starting the compressor, the control means starts the indoor blower when a number of revolution of the compressor becomes a predetermined number of revolution or more or when a high pressure side pressure becomes a predetermined pressure or more, and the control means starts the heat generating means when an air volume of the indoor blower becomes a predetermined low value, and controls the air volume of the indoor blower into the predetermined low value until a temperature of this heat generating means becomes higher than a predetermined value, and in a case where the temperature of the heat generating means becomes higher than the predetermined value, the control means increases the air volume of the indoor blower up to a target value.

4. The vehicle air-conditioning device according to claim 1, wherein after starting the compressor, the control means starts the indoor blower when a number of revolution of the compressor becomes a predetermined number of revolution or more, and controls an air volume of the indoor blower into a predetermined low value, and in a case where the number of revolution of the compressor becomes a target number of revolution, the control means increases the air volume of the indoor blower up to a target value.

5. The vehicle air-conditioning device according to claim 1, wherein in a case of a second low outdoor air temperature environment in which the outdoor air temperature is higher than that of the first low outdoor air temperature environment, the control means starts the indoor blower simultaneously with the compressor, immediately after the start of the compressor, or after the start of the compressor, and the control means starts the heat generating means simultaneously with the indoor blower, immediately after the start of the indoor blower, or after the start of the indoor blower.

6. The vehicle air-conditioning device according to claim 5, wherein after starting the indoor blower, the control means controls an air volume of the indoor blower into a predetermined low value, and in a case where a temperature of the heat generating means becomes higher than a predetermined value, the control means increases the air volume of the indoor blower up to a target value.

7. The vehicle air-conditioning device according to claim 5, wherein after starting the indoor blower, the control means starts the heat generating means when an air volume of the indoor blower becomes a predetermined low value, and the control means controls the air volume of the indoor blower into the predetermined low value until a temperature of the heat generating means becomes higher than a predetermined value or until a high pressure side pressure becomes a predetermined pressure or more, and in a case where the temperature of the heat generating means becomes higher than the predetermined value or in a case where the high pressure side pressure becomes the predetermined pressure or more, the control means increases the air volume of the indoor blower up to a target value.

8. The vehicle air-conditioning device according to claim 5, wherein after starting the indoor blower, the control means controls an air volume of the indoor blower into a predetermined low value, and starts the heat generating means when a number of revolution of the compressor becomes a predetermined number of revolution or more, and in a case where the number of revolution of the compressor becomes a target number of revolution, the control means increases the air volume of the indoor blower up to a target value.

9. The vehicle air-conditioning device according to claim 5, wherein in a case of a third low outdoor air temperature environment in which the outdoor air temperature is higher than that of the second low outdoor air temperature environment, the control means starts the indoor blower prior to the compressor, and the control means starts the heat generating means simultaneously with the indoor blower, immediately after the start of the indoor blower, or after the start of the indoor blower.

10. The vehicle air-conditioning device according to claim 9, wherein after starting the indoor blower, the control means starts the compressor when an air volume of the indoor blower becomes a predetermined low value, and the control means controls the air volume of the indoor blower into the predetermined low value until a temperature of the heat generating means becomes higher than a predetermined value, and in a case where the temperature of the heat generating means becomes higher than the predetermined value, the control means increases the air volume of the indoor blower up to a target value.

11. The vehicle air-conditioning device according to claim 9,
wherein after starting the indoor blower, the control means starts the heat generating means when an air volume of the indoor blower becomes a predetermined low value, and the control means starts the compressor simultaneously with the start of the heat generating means or immediately after the start of the heat generating means, and
the control means controls the air volume of the indoor blower into the predetermined low value until a temperature of the heat generating means becomes higher than a predetermined value or until a high pressure side pressure becomes a predetermined pressure or more, and in a case where the temperature of the heat generating means becomes higher than the predetermined value or in a case where the high pressure side pressure becomes the predetermined pressure or more, the control means increases the air volume of the indoor blower up to a target value.

12. The vehicle air-conditioning device according to claim 9,
wherein after starting the indoor blower, the control means starts the compressor when an air volume of the indoor blower becomes a predetermined low value, and
the control means controls the air volume of the indoor blower into the predetermined low value until a number of revolution of the compressor becomes a predetermined number of revolution or more, and in a case where the number of revolution of the compressor becomes the predetermined number of revolution or more, the control means increases the air volume of the indoor blower up to a target value.

13. The vehicle air-conditioning device according to claim 1,
wherein the heat generating means is disposed on a downstream side of the air flowing through the air flow passage to the radiator, and
in a case of a first low outdoor air temperature environment in which the outdoor air temperature is low, the control means starts the compressor and the heat generating means prior to the indoor blower.

14. The vehicle air-conditioning device according to claim 13,
wherein after starting the compressor, the control means starts the indoor blower when a number of revolution of the compressor becomes a predetermined number of revolution or more, and controls an air volume of the indoor blower into a predetermined low value, and
in a case where the number of revolution of the compressor becomes a target number of revolution, the control means increases the air volume of the indoor blower up to a target value.

15. The vehicle air-conditioning device according to claim 13,
wherein in a case of a second low outdoor air temperature environment in which the outdoor air temperature is higher than that of the first low outdoor air temperature environment, the control means starts the indoor blower and the heat generating means immediately after the start of the compressor or after the start of the compressor.

16. The vehicle air-conditioning device according to claim 15,
wherein after starting the indoor blower, the control means controls an air volume of the indoor blower into a predetermined low value, and
in a case where a number of revolution of the compressor becomes a target number of revolution, the control means increases the air volume of the indoor blower up to a target value.

17. The vehicle air-conditioning device according to claim 15,
wherein in a case of a third low outdoor air temperature environment in which the outdoor air temperature is higher than that of the second low outdoor air temperature environment, the control means starts the heat generating means and the compressor immediately after the start of the indoor blower or after the start of the indoor blower.

18. The vehicle air-conditioning device according to claim 17,
wherein after starting the indoor blower, the control means starts the compressor when an air volume of the indoor blower becomes a predetermined low value, and
the control means controls the air volume of the indoor blower into the predetermined low value until a number of revolution of the compressor becomes a predetermined number of revolution or more, and in a case where the number of revolution of the compressor becomes the predetermined number of revolution or more, the control means increases the air volume of the indoor blower up to a target value.

19. The vehicle air-conditioning device according to claim 1,
wherein the heat generating means is constituted of a heating medium circulating circuit which comprises a heating medium-air heat exchanger disposed in the air flow passage and circulates, through the heating medium-air heat exchanger, a heating medium heated by an electric heater or an engine.

20. The vehicle air-conditioning device according to claim 19,
wherein the heating medium circulating circuit comprises a valve unit which controls the circulation of the heating medium into the heating medium-air heat exchanger, and
the control means opens the valve unit, thereby starting the heat generating means.

21. The vehicle air-conditioning device according to claim 1,
wherein the heat generating means is constituted of an electric heater disposed in the air flow passage to heat the air to be supplied to the vehicle interior.

* * * * *